(12) United States Patent
Pfeifer et al.

(10) Patent No.: US 9,047,347 B2
(45) Date of Patent: Jun. 2, 2015

(54) SYSTEM AND METHOD OF MERGING TEXT ANALYSIS RESULTS

(71) Applicant: SAP AG, Walldorf (DE)

(72) Inventors: Katja Pfeifer, Walldorf (DE); Eric Peukert, Walldorf (DE)

(73) Assignee: SAP SE, Walldorf (DE)

( * ) Notice: Subject to any disclaimer, the term of this patent is extended or adjusted under 35 U.S.C. 154(b) by 150 days.

(21) Appl. No.: 13/913,847

(22) Filed: Jun. 10, 2013

(65) Prior Publication Data

US 2014/0365525 A1 Dec. 11, 2014

(51) Int. Cl.
G06F 17/30 (2006.01)

(52) U.S. Cl.
CPC .............................. G06F 17/30539 (2013.01)

(58) Field of Classification Search
CPC ................................................ G06F 17/30539
USPC ........................................................ 707/777
See application file for complete search history.

(56) References Cited

U.S. PATENT DOCUMENTS

| | | | |
|---|---|---|---|
| 5,873,081 A | 2/1999 | Harel | |
| 6,360,227 B1 | 3/2002 | Aggarwal et al. | |
| 6,446,061 B1 | 9/2002 | Doerre et al. | |
| 6,804,665 B2 | 10/2004 | Kreulen et al. | |
| 7,243,092 B2 | 7/2007 | Woehler et al. | |
| 7,801,841 B2 | 9/2010 | Mishra et al. | |
| 8,417,709 B2 | 4/2013 | Chiticariu et al. | |
| 8,660,905 B2 | 2/2014 | Weber et al. | |
| 2007/0219992 A1 | 9/2007 | Bollinger et al. | |
| 2011/0289164 A1 | 11/2011 | Griset et al. | |
| 2011/0302124 A1 | 12/2011 | Cai et al. | |
| 2013/0096944 A1 | 4/2013 | Shah et al. | |
| 2013/0144605 A1 | 6/2013 | Brager et al. | |
| 2013/0238531 A1 | 9/2013 | Seidler et al. | |
| 2013/0318076 A1 | 11/2013 | Chiticariu et al. | |

FOREIGN PATENT DOCUMENTS

| | | |
|---|---|---|
| EP | 2400437 | 12/2011 |
| EP | 2400438 | 12/2011 |

OTHER PUBLICATIONS

AlchemyAPI (2013). http://www.alchemyapi.com/. Printed on May 17, 2013.
W.W.K. Chua and E. Rahm, "Discovering Cross-Ontology Subsumption Relationships by Using Ontological Annotations on Biomedical Literature". In Cornet, R. and Stevens, R., editors, ICBO, vol. 897 of CEUR Workshop Proceedings. 2012.
Do, H. H. and Rahm E. "COMA—A System for Flexible Combination of Schema Matching Approach." in VLDB Proceedings. 2002.
Drumm, C., Schmitt, M., Do, H.-H., and Rahm, E. (2007). "QuickMig: Automatic Schema Matching for Data Migration Projects." in CIKM'07 Proc.
Evri (2012). http://www.evri.com/developer/. Jun. 2012.
Fise (2013). http://wiki.iks-project.eu/index.php/FISE. Mar. 2013.
Grimes, S. (2008). "Unstructured data and the 80 percent rule."

(Continued)

*Primary Examiner* — Baoquoc N To
(74) *Attorney, Agent, or Firm* — Fountainhead Law Group PC

(57) ABSTRACT

A system and method of merging text analysis results. The system uses a set of three corrected, weakened Jaccard factors to determine whether the respective results of multiple text analysis operations are equal, subtypes of each other or associated with each other, in order to merge the results.

20 Claims, 12 Drawing Sheets

(56) References Cited

OTHER PUBLICATIONS

Hotho, A., Nuernberger, A., and Paass, G. (2005). "A Brief Survey of Text Mining." LDV Forum, 20(1):19-62.

Hu, W. and Qu, Y. (2008). "Falcon-AO: A practical Ontology Matching System." Web Semantics, 6(3):237-239.

Isaac, A., Van Der Meij,, L., Schlobach, S., and Wang, S. (2007). "An Empirical Study of Instance-Based Ontology Matching." In ISWC'07 Proc., pp. 253-266.

Jean-Mary, Y. R., Shironoshita, E. P., and Kabuka, M. R. (2009). "Ontology Matching with Semantic Verification." Web Semantics, 7(3):235-251.

Li, J., Tang, J., Li, Y., and Luo, Q. (2009). "RiMOM: A Dynamic Multistrategy Ontology Alignment Framework." TKDE, 21(8):1218-1232.

Massmann, S. and Rahm, E. (2008). "Evaluating Instance-based Matching of Web Directories." in WebDB'08 Proceedings.

OpenCalais (2013). http://www.opencalais.com/. Mar. 2013.

Rahm, E. and Bernstein, P. A. (2001). "A Survey of Approaches to Automatic Schema Matching." The VLDB Journal, 10:334-350.

Seidler, K. and Schill, A. (2011). "Service-oriented Information Extraction." In Joint EDBT/ICDT Ph.D. Workshop'11 Proc., pp. 25-31.

Shvaiko, P. and Euzenat, J. (2005). "A Survey of Schema-Based Matching Approaches." Journal on Data Semantics IV.

Suchanek, F. M., Abiteboul, S., and Senellart, P. (2011). "Paris: probabilistic alignment of relations, instances, and schema." Proc. VLDB Endow., 5(3):157-168.

A. Thor, T. Kirsten, and E. Rahm, "Instance-based matching of hierarchical ontologies." In BTW'07 Proc., 2007.

C. Grover, H. Halpin, E. Klein, J. L. Leidner, S. Potter, S. Riedel, S. Scrutchin, and R. Tobin, "A framework for text mining services." In AHM'04 Proc., 2004.

J. Starlinger, F. Leitner, A. Valencia, and U. Leser. "SOA-Based Integration of Text Mining Services." In Services '09 Proc., pp. 99(106, 2009.

U.S. Appl. No. 13/416,974, filed on Mar. 9, 2012, entitled: Automatic Combination and Mapping of Text-Mining Services, application not published.

Jaccard index, from Wikipedia, last modified on Apr. 9, 2013.

Sorensen-Dice coefficient, from Wikipedia, last modified on Apr. 20, 2013.

B. Habegger and M. Quafafou, "Web Services for Information Extraction from the Web," in ICWS'04 Proc. p. 279, IEEE Computer Society, 2004.

Do Hong Hai, "Schema Matching and Mapping-Based Data Integration," PD Thesis, Aug. 31, 2005.

Melanie Hilario et al., "Ontology-Based Meta-Mining of Knowledge Discovery Workflows," In "Video Analytics for Business Intelligence", Jan. 1, 2011, Springer Berlin. vol. 358, pp. 273-315.

Katrin Simone Zaiss, "Instance-Based Ontology Matching and the Evaluation of Matching Systems," Inaugural dissetation Erlangung des Doktorgrades der Mathematisch . . . Nov. 30, 2010.

S. Castano S. et al., "On the Ontology Instance Matching Problem," Database and Expert Systems Application, 2008. Dexa '08. 19th International Conference on, IEEE, Sep. 1, 2008, pp. 180-184.

Christian Drumm et al., "Quickmig," Proceedings of the Sixteenth ACM Conference on Conference on Information and Knowledge Management, CIKM '07, Jan. 1, 2007, p. 107.

European Search Report (from a corresponding foreign application), EP13000646.3, mailed Jan. 27, 2014.

Pavel Shvaiko, et al.; "Ontology Matching"; Springer-Verlag Berlin Heidelberg; 2007; 332 pages.

Airbus owner EADS returns to profit in 2010
●━━━●

. . . Separately, Cathay Pacific announced a multi-billion dollar deal with Airbus.
●━━━━━● ●━━●

The Hong Kong-based airline said it would be buying 15 A330-300 airplanes.
●–·–·–● ●·········●·–·–·–●

●━━━● Company
●–·–·● Country
●–··–● Industry Term
●········● Product

FIG. 1A

Airbus owner EADS returns to profit in 2010
■━━━■  ■━━━■

. . . Separately, Cathay Pacific announced a multi-billion dollar deal with Airbus.
■–·–·–·–■ ■━━━■

The Hong Kong-based airline said it would be buying 15 A330-300 airplanes.
■–·–·–■ ■·········■

■━━━■ AerospaceCompany
■–·–·■ Company
■–··–■ City
■········■ Aircraft

FIG. 1B

Airbus owner EADS returns to profit in 2010
o———o

. . . Separately, Cathay Pacific announced a multi-billion dollar deal with Airbus.
o————————o                                              o———o The Hong Kong-based airline said it would be buying 15 A330-300 airplanes.
o·············o o———o Company
o········o Country

FIG. 1C

Airbus owner EADS returns to profit in 2010
□———□    □———□

. . . Separately, Cathay Pacific announced a multi-billion dollar deal with Airbus.
□————————□                                              □———□

The Hong Kong-based airline said it would be buying 15 A330-300 airplanes.
□·············□

□———□ Organizations
□········□ Places

FIG. 1D

```
Merge( results, services )
      mergedResult = empty;
      taxonomy = getPreviouslyRetrievedTaxonomy();
      taxonmies[ ] = retrieveTaxonomies(services)
      if(notInludedInGlobalTaxonomy(taxonmies[ ], taxonomy))
      {
              taxonmies[ ] = enrichWithInstances(taxonmies, services)
              mappings=computeMappings(taxonmies)
              taxonomy = mergeTaxonomy(mappings);
      }
      mergedResult = mergeResult(taxonomy, results)
return mergedResult;
```

FIG. 10

SYSTEM AND METHOD OF MERGING TEXT ANALYSIS RESULTS

CROSS REFERENCE TO RELATED APPLICATIONS

Not applicable.

BACKGROUND

1. Technical Field

The present disclosure relates to data processing, and in particular, to presenting information to users.

2. Description of the Related Art

Unless otherwise indicated herein, the approaches described in this section are not prior art to the claims in this application and are not admitted to be prior art by inclusion in this section.

Huge amounts of textual information relevant for market analysis, trending or product monitoring can be found on the Web. Analysts estimate that up to 80% of all business relevant information within companies and on the web is stored as unstructured textual documents. Being able to exploit such information (for example, for market analysis, trending, or web monitoring) is a competitive advantage for companies.

To make use of that information, a number of text mining techniques exist that extract and categorize entities from given text. These techniques include the classification of text documents, the recognition of entities and relationships as well as the identification of sentiments. Recently, many of these text mining techniques were made publicly available as web services (e.g., OpenCalais, AlchemyAPI, etc.) to simplify their consumption and application integration. Individual services often have specific strengths and weaknesses.

SUMMARY

Given the individual strengths and weaknesses of the various text mining services, merging results from multiple services can improve quality. To merge results, mappings between service taxonomies may be used since different taxonomies are used for categorizing extracted information. The mappings may be computed by using ontology matching systems.

Unfortunately, merging the results from multiple extraction services is problematic since individual services rely on different taxonomies or sets of categories to classify or annotate the extracted information (e.g., entities, relations, text categories). Further, the available meta data within most taxonomies is weak so that ontology matching systems currently return insufficient results.

In recognition of these problems, detailed below is a system to enrich service taxonomies with instance information that may be used for finding mappings. Based on the found instances, the system implements a novel instance-based matching technique and metric that allows the system to automatically identify equal, hierarchical (also referred to as "subtype"), and associative mappings. These mappings may be used for merging results of multiple extraction services.

One embodiment is a computer-implemented method of merging text analysis results. The method includes processing, by a computer system, a plurality of text information according to a first text processing service to generate a first plurality of instances annotated according to a first taxonomy having a first set of elements. The method further includes processing, by the computer system, the plurality of text information according to a second text processing service to generate a second plurality of instances annotated according to a second taxonomy having a second set of elements. The method further includes calculating, by the computer system, a first coefficient between a first set of instances and a second set of instances according to a first corrected, weakened Jaccard factor. The first set of instances corresponds to a first element of the first set of elements and wherein the second set of instances corresponds to a second element of the second set of elements. The method further includes calculating, by the computer system, a second coefficient between the first set of instances and the second set of instances according to a second corrected, weakened Jaccard factor. The method further includes calculating, by the computer system, a third coefficient between the first set of instances and the second set of instances according to a third corrected, weakened Jaccard factor. The method further includes determining, by the computer system, that the first element is a subtype of the second element, that the second element is a subtype of the first element, or that the first element is associated with the second element, according to the first coefficient, the second coefficient and the third coefficient. The method further includes merging, by the computer system, the first taxonomy and the second taxonomy according to the first element and the second element being associated, the first element being the subtype of the second element, or the second element being the subtype of the first element.

The method may further include determining, by the computer system, that the first element is equal to the second element either when the first coefficient, the second coefficient and the third coefficient are each greater than 0.8 or as determined according to a transformation operation performed on the first coefficient, the second coefficient and the third coefficient. In such a case, merging the first taxonomy and the second taxonomy comprises merging the first taxonomy and the second taxonomy according to the first element and the second element being equal, associated, the first element being the subtype of the second element, or the second element being the subtype of the first element.

The method may further include determining, by the computer system, that the first element is the subtype of the second element when the second coefficient is greater than 0.65 and a difference between the first coefficient and the third coefficient is less than 0.05.

The method may further include determining, by the computer system, that the second element is the subtype of the first element when the third coefficient is greater than 0.65 and a difference between the first coefficient and the second coefficient is less than 0.05.

The method may further include determining, by the computer system, that the first element is associated with the second element when the first element is not equal to the second element, the first element is not the subtype of the second element, the second element is not the subtype of the first element, and at least one of the first coefficient, the second coefficient and the third coefficient is greater than 0.2.

The first corrected, weakened Jaccard factor may correspond to a Jaccard factor having a numerator and a denominator, where the Jaccard factor is corrected in the numerator with a correction factor and weakened in the denominator with a weakening factor.

The second corrected, weakened Jaccard factor may correspond to a ratio between a corrected intersection size and a corrected instance set size, where the corrected intersection size is the size of the intersection of the first set of instances and the second set of instances corrected with a correction factor, and where the corrected instance set size is the size of the first set of instances deducted by the number of instances only found by the first text processing service multiplied with a weakening factor.

The third corrected, weakened Jaccard factor may correspond to a ratio between a corrected intersection size and a corrected instance set size, where the corrected intersection size is the size of the intersection of the first set of instances and the second set of instances corrected with a correction factor, and where the corrected instance set size is the size of the second set of instances deducted by the number of instances only found by the second text processing service multiplied with a weakening factor.

The weakening factor may reduce the negative effect resulting from the first plurality of instances being greater than the second plurality of instances or the second plurality of instances being greater than the first plurality of instances. The weakening factor may range between 0.90 and 0.97.

The correction factor may range between 0.45 and 0.75.

The method may further include performing the calculating and determining between each of the elements of the first set of elements and each of the elements of the second set of elements, respectively, in order to merge all the elements of the taxonomies.

The method may further include processing, by the computer system, the plurality of text information according to a third text processing service and merging the third taxonomy with the other taxonomies according to the results.

A computer system may operate to implement the method described above. The computer system may store, execute or be otherwise controlled by one or more computer programs that control the computer system to implement the method described above. The computer system may include a processor and a memory that operate to perform the functionality of the method.

A non-transitory computer readable medium may store instructions to control a computer system to perform the method described above. The instructions may include a processing component, a calculating component, a determining component, and a merging component.

In this manner, the system improves the efficiency of a user who wants to use multiple text processing services.

The following detailed description and accompanying drawings provide a better understanding of the nature and advantages of the present disclosure.

BRIEF DESCRIPTION OF THE DRAWINGS

FIGS. 1A-1D are text diagrams that illustrate the problems involved in merging the results of various text analysis services.

FIG. 10 is a diagram that shows the mergeResult process.

DETAILED DESCRIPTION

Figure 2A:
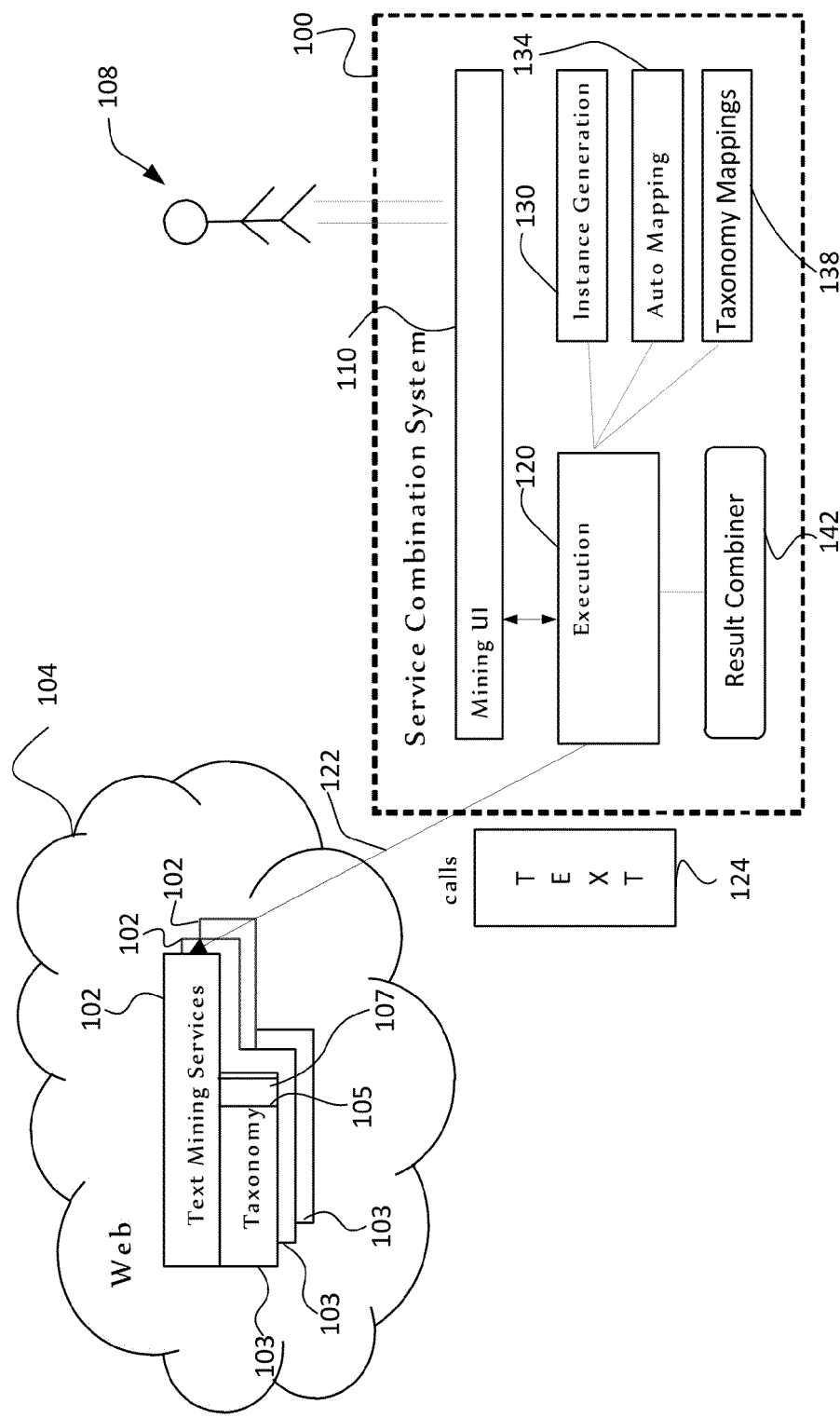
FIG. 2A is a block diagram showing the general system architecture.

Described herein are techniques for merging results from text analysis. In the following description, for purposes of explanation, numerous examples and specific details are set forth in order to provide a thorough understanding of the present disclosure. It will be evident, however, to one skilled in the art that the present disclosure as defined by the claims may include some or all of the features in these examples alone or in combination with other features described below, and may further include modifications and equivalents of the features and concepts described herein.

In this document, various methods, processes and procedures are detailed. Although particular steps may be described in a certain sequence, such sequence is mainly for convenience and clarity. A particular step may be repeated more than once, may occur before or after other steps (even if those steps are otherwise described in another sequence), and may occur in parallel with other steps. A second step is required to follow a first step only when the first step must be completed before the second step is begun. Such a situation will be specifically pointed out when not clear from the context. A particular step may be omitted; a particular step is required only when its omission would materially impact another step.

In this document, the terms "and", "or" and "and/or" are used. Such terms are to be read as having the same meaning; that is, inclusively. For example, "A and B" may mean at least the following: "both A and B", "only A", "only B", "at least both A and B". As another example, "A or B" may mean at least the following: "only A", "only B", "both A and B", "at least both A and B". When an exclusive-or is intended, such will be specifically noted (e.g., "either A or B", "at most one of A and B").

In this document, various computer-implemented methods, processes and procedures are described. It is to be understood that the various actions (receiving, storing, sending, communicating, displaying, etc.) are performed by a hardware device, even if the action may be authorized, initiated or triggered by a user, or even if the hardware device is controlled by a computer program, software, firmware, etc. Further, it is to be understood that the hardware device is operating on data, even if the data may represent concepts or real-world objects, thus the explicit labeling as "data" as such is omitted. For example, when the hardware device is described as "storing a record", it is to be understood that the hardware device is storing data that represents the record.

1 INTRODUCTION

FIGS. 1A-1D are text diagrams that illustrate the problems involved in merging the results of various text analysis services. Each of the figures has example information. Entities in the example information have been annotated by several text mining services (OpenCalais, Evri, AlchemyAPI, and FISE) in FIGS. 1A-1D respectively. Each of these services relies on different taxonomies to annotate found entities. For instance, the text sequence "Airbus" is annotated with three different entity types (categories): Organization (by FISE), Company (by AlchemyAPI and OpenCalais) and AerospaceCompany (by Evri). More specifically, FIG. 1A shows that OpenCalais categorizes the information within the provided text snippet into four entity types; FIG. 1B shows that Evri categorizes the information into four entity types; FIG. 1C shows that AlchemyAPI categorizes the information into two entity types; and FIG. 1D shows that FISE categorizes the information into two entity types.

To be able to combine and merge extraction results from multiple services, a mapping between different taxonomy types is required. Finding mappings between different service taxonomies manually is not feasible as the taxonomies can be very large and evolve over time (e.g., AlchemyAPI uses a taxonomy for entity types with more than 400 types). Unfortunately, applying existing (semi-)automatic ontology and schema matching techniques does not provide the requested quality since the available metadata within existing service taxonomies is weak (i.e., no descriptions are available, the taxonomies have a flat structure). Moreover, existing matching approaches are not able to identify relations between the taxonomy types (i.e., if two types are equal or just associated, or if one type is a subtype of the other).

To overcome those limitations, further detailed below is a system that implements a novel taxonomy alignment process that enables the merging of taxonomies for text mining services. The following features are noteworthy:

The system implements a novel approach of using instance enrichment to support taxonomy matching. An enrichment process is used to populate taxonomies of text mining services with instance data by running the services on sample documents and collecting the produced annotations.

Based on these instances, a new taxonomy alignment approach is implemented that uses a combined matching strategy.

In particular, a novel metric for instance-based matchers is implemented that is able to identify equal, hierarchical and associative mappings. The metric is generic and could well be applied for other instance-based matching tasks.

The application of the taxonomy alignment process is broadly evaluated on a number of real-world text mining services and their taxonomies. For that purpose we created an online survey with numerous participants to create reference mappings that were later used for evaluating the system. We compare to state-of-the-art instance-based alignment methods that are used in ontology matching systems.

The remainder of the description is structured as follows: In Section 2 we formally describe the problem and introduce the notation being used within this document. Section 3 introduces our taxonomy alignment process and presents the instance enrichment process, the metric for instance-based matching as well as the combined matching strategy used within our process. The experimental setup and the results of our evaluation can be found in Sections 4 and 5. We introduce an exemplary application that makes use of the introduced taxonomy alignment process in Section 6 before we review related work in Section 7. Section 8 closes with a summary, conclusions and additional details.

2 PROBLEM DESCRIPTION

Combining the results of multiple text mining services is promising as it can increase the quality and functionality of text mining. In order to enable the aggregation of results of various text mining services, a mapping between the different underlying taxonomies is required. However, finding such a mapping is challenging even though the names of the taxonomy types being presented to the user when annotating text are typically clear and easy to understand. A review of existing text mining services and their taxonomies revealed that the taxonomies differ strongly in granularity, naming and their modeling style. Many taxonomies are only weakly structured and most taxonomy types are lacking any textual description. Therefore manually defining a mapping between text-mining taxonomies is a complex, challenging and time consuming task.

The system described below applies ontology- and schema matching techniques to automatically compute mappings between text mining taxonomies. Matching systems take a source and a target ontology as input and compute mappings (alignments) as output. They employ a set of so called matchers to compute similarities between elements of the source and target and assign a similarity value between 0 and 1 to each identified correspondence. Some matchers primarily rely on schema-level information whereas others also include instance information to compute element similarities. Typically, the results from multiple of such matchers are combined by an aggregation operation to increase matching quality. In a final step, a selection operation filters the most probable correspondence to form the final alignment result.

Unfortunately existing matching approaches solve the challenges of matching text mining taxonomies only partly. Schema-based matchers can only be applied to identify mappings between equal concepts (e.g., by using a name-matcher) as the scarcity of broader meta data disables the use of more enhanced matchers (e.g., retrieving hierarchical mappings through the comparison of the taxonomy structure). Instance-based approaches are mainly limited to equal mappings. The few instance-based approaches that support hierarchical mappings still suffer from limited accuracy as we show in our evaluation (see Section 7 for a complete review of related work). Furthermore, no instances exist for most of the text mining taxonomies.

To overcome the aforementioned limitations, the system implements an instance enrichment algorithm that populates the taxonomy types with meaningful instances. This allows us to apply instance-based matchers and similarity metrics like Jaccard and Dice to identify mapping candidates. Since those metrics can only be used to identify equality mappings, we introduce a novel metric that allows the system to identify hierarchical and associative mappings like broader-than, narrower-than or is-related to. The system integrates the instance enrichment and instance matching together with some optimizations in a novel taxonomy alignment process that we describe below.

To sharpen the description of the features of the system, we formalize the problem. The overall goal of the taxonomy alignment process is to integrate the taxonomies $\mathcal{T}_{1\,1}$, $\mathcal{T}_{1\,2}, \ldots \mathcal{T}_{1\,n}$ of the text mining services $S_1, S_2, \ldots, S_n$ into one global taxonomy $\mathcal{G}$. We make the assumption that each service $S_i$ uses its own taxonomy $\mathcal{T}_{1\,i}$ to classify the text mining results. In order to align two taxonomies $\mathcal{T}_{1\,s}$ and $\mathcal{T}_{1\,r}$, mappings between the types (also referred to as the elements) of the taxonomies need to be identified. A mapping M is a triple $(T_{sj}, T_{tk}, R)$ in which $R \in \{\equiv, <, >, \sim\}$ indicates a relation between a type $T_{sj} \in \mathcal{T}_{1\,s}$ and a type $T_{tk} \in \mathcal{T}_{1\,r}$. $(T_{sj}, T_{tk}, \equiv)$ means that the taxonomy types $T_{sj}$ and $T_{tk}$ are equivalent, $(T_{sj}, T_{tk}, <)$ indicates that $T_{sj}$ is a subtype of $T_{tk}$ (i.e., $T_{sj}$ is narrower than $T_{tk}$), and $(T_{sj}, T_{tk}, >)$ is the inverse subsumption relation (i.e., $T_{sj}$ is broader than $T_{tk}$). $(T_{sj}, T_{tk}, \sim)$ represents an associative relation (e.g., "car" and "truck" are associated). The set of instances annotated by a type $T_{ij}$ is specified by $I(T_{ij})$, its cardinality by $|I(T_{ij})|$. When matching two dissimilar taxonomies, we speak of inter-matching, whereas matching the types of a taxonomy with itself $\mathcal{T}_{1\,s} = \mathcal{T}_{1\,t}$ is called intra-matching. In the intra-matching case, the set of relations that need to be identified is R E $\{<, >, \sim\}$ since equal mappings are not relevant.

3 TAXONOMY ALIGNMENT PROCESS

Initially, the overall taxonomy alignment process is described. The process consists of several new techniques such as the instance enrichment process, the intersection ratio triple (IRT) metric, and several enhancements of the matching process that are presented in detail in Section 3.2 to 3.4.

3.1 Overall Alignment Process

FIG. 2A is a block diagram showing the general system architecture 100. The system 100 is similar to, and an improvement upon, the system described in U.S. application Ser. No. 13/416,974 filed Mar. 9, 2012 by the same inventors of the present patent application, and which is incorporated herein by reference. The system 100 integrates with a plurality of text mining services 102 available on the web 104. Each text mining service 102 produces text mining results according to taxonomy 103 comprising individual elements (entity types or categories) 105. Each taxonomy element 105 may include metadata 107, examples of which include but are not limited to an element name, an element description (annotation), and a structure of the element within a taxonomy hierarchy.

As used herein, such existing text mining services may allow for one or more of the following.
  Named Entity Recognition (NER), where entities are identified and classified into predefined categories (e.g. person, organization).
  Relation and Interaction Extraction for the identification of relationships between two or more entities.
  Text Classification/Categorization where categories are assigned to text documents.
  Concept Tagging for the assignment of specific terms that are derived from the text content (the terms do not have to be included in the text).
  Keyword Extraction where the essence of the text is extracted through the identification of the main keywords of a text.
  Sentiment Analysis for the extraction of any subjective information from text (e.g. polarity, attitudes, mood).

A human user and/or external application 108 interacts with the service combination system 100 through a respective mining user interface (UI) 110, which may be an available application program interface (API). This extraction interface allows definition of a mining task and inspection of the results thereof.

The execution 120 issues calls 122 to multiple text mining services 102. These calls include text documents 124 whose content is to be mined.

The execution 120 then integrates the result of the multiple text mining services by using additional components. First, an instance generation component 130 generates instances for each element 105 of the taxonomy 103 attached to the particular text mining service used.

The generated instances are then forwarded to the auto-mapping component 134 that computes a matching between the different taxonomies. This matching is converted into a taxonomy mapping 138 that may be saved in order to avoid repeated instance generation and mapping processes for similar taxonomies.

The computed mapping 138 is then input to the result combiner 142, together with the extraction results 150 obtained from calling the different text mining services. The result combiner returns the merged result sets 152 to the execution, and finally to the User (or API).

As compared to U.S. application Ser. No. 13/416,974, the present patent application improves mainly upon the auto-mapping component 134. Where the auto-mapping component of U.S. application Ser. No. 13/416,974 is only able to identify equal mappings, the auto-mapping component 134 of the present application is also able to identify subtype (hierarchical) mappings and associative mappings, as further described below.

Figure 2B:
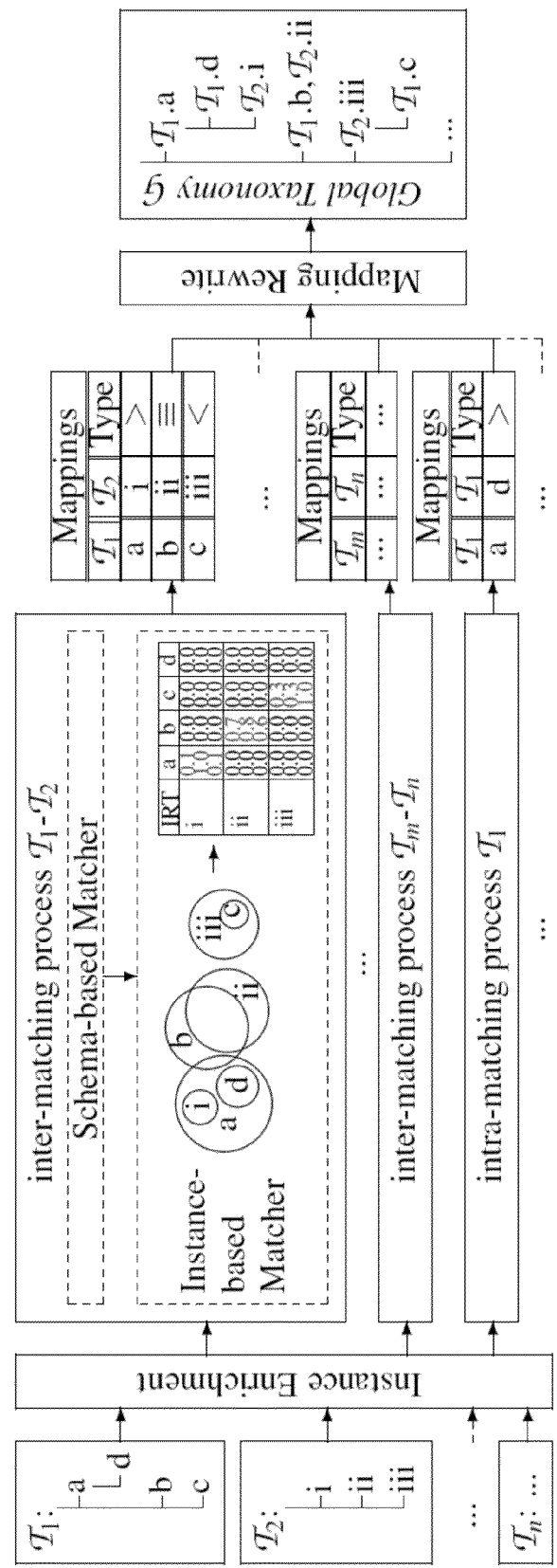
FIG. 2B is a block diagram showing the general taxonomy alignment process.

FIG. 2B is a block diagram showing the general taxonomy alignment process. In FIG. 2B, the overall idea is to retrieve mappings for the taxonomy types by a matching process. Based on the mappings a global taxonomy $\mathcal{G}$ is derived. This taxonomy $\mathcal{G}$ reflects all types of the individual taxonomies $\mathcal{T}_{i\,i}$ and the relations between the particular types (expressed in the mappings). Before the mappings are integrated they can optionally be cleaned (e.g., by detecting cycles within the graph) and complemented by new mappings (e.g., by exploiting the given hierarchical structure) in a mapping rewrite step as done by existing ontology matching tools like ASMOV. In order to integrate n taxonomies, $$\binom{n}{2}$$

inter-matching processes and n intra-matching processes are applied within our taxonomy alignment process. Each of these inter-matching processes takes two taxonomies as input and identifies equivalence, hierarchical and associative mappings between the types of these taxonomies. The intra-matching processes discover hierarchical and associative mappings within one taxonomy in order to validate and correct/enhance the existing taxonomy structures.

The inter-matching process is implemented by a combined matcher consisting of a schema-based and an instance-based matcher. The schema-based matcher exploits the names of the taxonomy types (e.g., $T_1$.a and $T_2$.i in FIG. 2B) and is able to identify candidates for equivalence mappings. If sufficient metadata is available for the taxonomies, the schema-based matcher may be extended with matchers that additionally take into account the descriptions or the structures of the input taxonomies. The instance-based matcher exploits the instances of the taxonomy types to identify mapping candidates. The instances of the taxonomy types are retrieved by a new iterative instance enrichment algorithm that we present in Section 3.2. Furthermore the instance-based matcher applies a novel similarity metric—the intersection ratio triple (IRT)—that allows the system to identify equivalence, hierarchical as wells as associative relations between the taxonomy types. We will present the metric in Section 3.3 and give details on the inter- and intra-matching process in Section 3.4.

The intra-matching process uses a slightly adjusted version of the instance-based matcher. A combination with a schema-based matcher is not necessary as equivalence mappings are irrelevant here. The results of the intra-matching process can be used to bring structure into flat taxonomies and check and correct given taxonomy structures.

3.2 Instance Enrichment Algorithm

Usually, no instances are directly available for text mining taxonomies. To follow an instance-based matching approach as proposed in Section 3.1, the taxonomy needs to be enriched with instance data (if complete sets of instances are already available for all services the instance enrichment step can be omitted). In the following we propose an instance enrichment process applicable for named entity recognition (NER) services and their taxonomies. However, the general process can be transferred to other text mining services and their taxonomies.

Instances of an entity type can be obtained by executing the services on text documents and collecting the extracted information. Depending on the service, concrete text instances (e.g., the text snippet "Barack Obama") can be assigned to several entity types (e.g. Person, Politician, USPresident) or to only one of those types (e.g. USPresident as it is the narrowest entity type).

The general idea of the instance enrichment algorithm is to enter a number of text documents into each of the text mining services whose taxonomies are to be matched. The NER results of the services (i.e., the text snippets with assigned categories) are grouped by each entity type for each service. In order to consider the entity disambiguation feature (e.g., "Paris" is recognized as City and in another context as Person), the context of the entity instances (i.e., document name and position) is attached to the text snippet.

Figure 3:
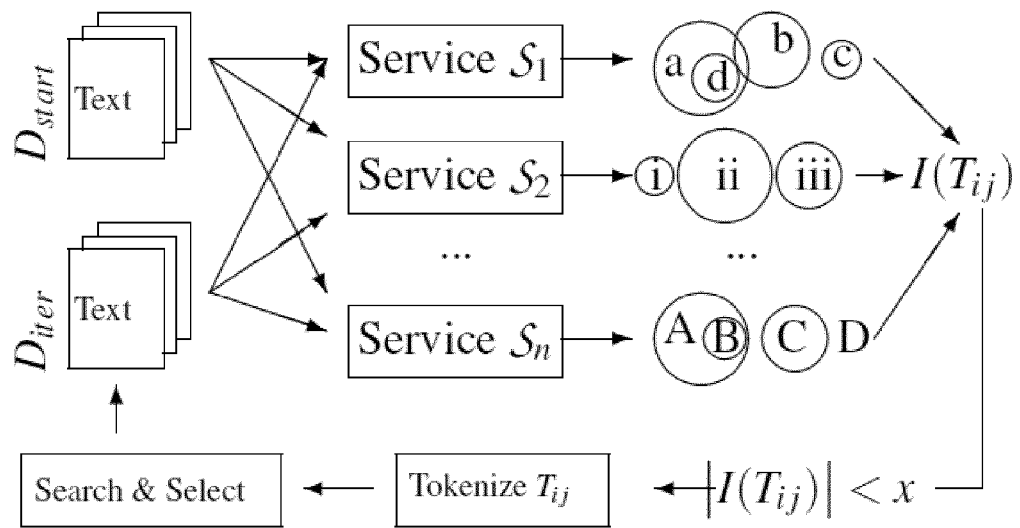
FIG. 3 is a block diagram of an iterative instance enrichment process.

It is noteworthy that the generated instances are directly depending on the document set and the quality of the text mining services. We observed that only a subset of the entity types from the extraction taxonomies we took into account were enriched with instances when taking arbitrary text documents. For that reason, we propose an iterative instance enrichment process for the taxonomies $T_i$ of the considered services $S_i$ (i=1, 2, . . . , n) as follows (with reference to FIG. 3 as a block diagram of the iterative process):

1. Randomly select a fixed number of documents $D_{start}$ from a document base that covers a huge amount of different concepts (e.g., articles from Wikipedia). Set $D=D_{start}$, iter=0 and create empty instance sets $I(T_{ij})$ for each element $T_{ij} \in T_i$ for each of the taxonomies $T_i$.

2. Enter the documents D into the text mining services $S_i$ and cluster the results on the entity types $T_{ij} \in T_i$ for each taxonomy. Add the retrieved instances into the instance sets $I(T_{ij})$.

3. Select the entity types $T_{ij}$ without any instances (optionally: with less than x instances) in the instance sets $I(T_{ij})$ (i.e., $|I(T_{ij})|=0$ or $<x$). If the number of those entity types is zero, stop the iteration; else tokenize the names of these entity types.

4. Search the document base by using the particular extracted tokens as search string (e.g., search Wikipedia). Take the f first results of this search not yet having been included in D and add these documents to $D_{iter}$.

5. Set $D=D_{iter}$, increment iter and go on with step 2. Iterate as long as the fixed maximum number of iterations $iter_{max}$ is reached or step 3 aborts the process.

The process for the generation of a qualified document set described here can be automatically executed and therefore fits perfectly for a self-acting matching process. With our adaptive approach we are able to retrieve a high number of instances with only few service calls. This is important since calling services takes time and is costly.

3.3 IRT Metric

In this section, we present our novel similarity metric for instance-based matchers that is able to indicate equivalence, hierarchical and associative relations between the elements of two taxonomies $T_{i\_s}$ and $T_{i\_t}$. Additionally it allows to identify hierarchical and associative relations within one taxonomy, when used with slightly changed parameters.

It is a common technique within instances-based matchers to rate the similarity of two taxonomy elements $T_{sj} \in T_i^s$ and $T_{tk} \in T_{i\_t}$ by analyzing instance overlaps and to represent them by a similarity metric. We propose a novel metric that consists of three single values to represent equivalence, hierarchical and associative relations. The metric adopts the corrected Jaccard coefficient presented by Isaac et al. (2007):

$$JCcorr(T_{sj}, T_{tk}) = \frac{\sqrt{|I(T_{sj}) \cap I(T_{tk})| \times (I(T_{sj}) \cap I(T_{tk}) - c)}}{|I(T_{sj}) \cup I(T_{tk})|} \quad (1)$$

In contrast to the original Jaccard coefficient, that is the ratio of the instance intersection size and the size of the union of the instances, the corrected Jaccard coefficient considers the frequency of co-occurring instances with its correction factor c. It assigns smaller similarity scores to element pairs whose instances co-occur less frequently. That means, that a smaller score is assigned to one co-occurring instance in a union set of two instances compared to 100 co-occurring instances in a 200 instances large union set (the classical Jaccard coefficient would assign 0.5 to both cases). Although Isaac et al. (2007) suggests a value of c=0.8, a value of c=0.6 works better with the system described herein, as determined through experimentation; more generally, the range 0.45<c<0.75 also works well with the system described herein. Note that the influence of the c factor is small (nearly no influence when instance sets are not very small). The factor c can slightly increase the quality of the matching process for small instance sets. However, the IRT metric can as well be used with the normal Jaccard value (setting c=0), when instance sets have no problems of data sparseness or if setting the configuration value c is too complicated or unclear.

We rely on this basic metric as it allows us to deal with possible data sparseness of the instances determined with our instance enrichment process. Additionally, the instances retrieved from text mining services have some quality restrictions that need to be handled. Text mining faces the problem of potentially being inaccurate. Thus, the instances can include false positives (i.e., instances having been extracted wrongly) and for some services miss false negatives (e.g., instances that should be extracted, but having eventually only been extracted by some services).

In order to handle these quality restrictions, we propose an extension of the corrected Jaccard metric (also referred to as a corrected, weakened Jaccard factor) as follows: We introduce a weakening factor w that reduces a negative effect of instances only found by one of the services. The factor is trying to correct the influence of the false positives and negatives of the NER process. Therefore the set of distinct instances $I_d(T_{sj})$ and $I_d(T_{tk})$ that were only extracted by one of the services (independent from the entity type assigned to them) are integrated in the corrected Jaccard factor weakened by w:

$$JCcorr^+(T_{sj}, T_{tk}) = \frac{\sqrt{|I(T_{sj}) \cap I(T_{tk})| \times (|I(T_{sj}) \cap I(T_{tk})| - c)}}{|I(T_{sj}) \cup I(T_{tk})| - w|I_d(T_{sj})| - w|I_d(T_{tk})|} \quad (2)$$

with

-continued $$I_d(T_{sj}) \subseteq I(T_{sj}) \setminus \bigcup_{A \in T_t} I(A),$$

$$I_d(T_{tk}) \subseteq I(T_{tk}) \setminus \bigcup_{B \in T_s} I(B) \text{ and}$$

$$0 \leq w \leq 1$$

Figure 4:
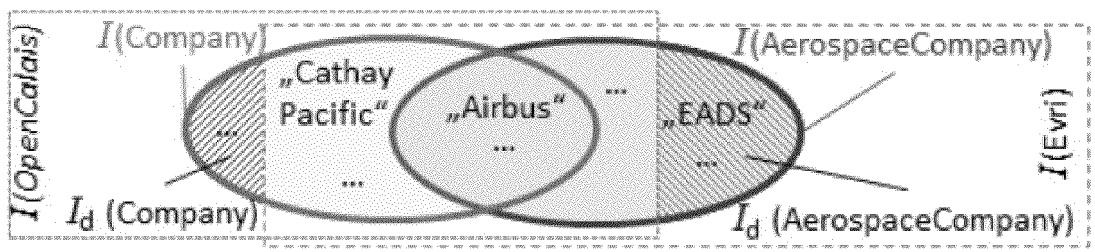
FIG. 4 is a diagram that exemplarily depicts the interrelationships between the quality restrictions (e.g., "EADS" as false negative annotation for OpenCalais, as shown in FIG. 1A) and the distinct instances (using the data from FIGS. 1A-1B).

FIG. 4 is a diagram that exemplarily depicts the interrelationships between the quality restrictions (e.g., "EADS" as false negative annotation for OpenCalais, as shown in FIG. 1A) and the distinct instances (using the data from FIGS. 1A-1B). Note that both OpenCalais and Evri categorized certain instances (e.g., Airbus) as both Company and AerospaceCompany; that OpenCalais categorized certain instances (e.g., Cathay Pacific) as Company that Evri categorized as something other than AerospaceCompany; and that Evri categorized certain instances (e.g., EADS) as AerospaceCompany that OpenCalais did not categorize. Thus, EADS is within the area for $I_d$ (AerospaceCompany) in FIG. 4.

The similarity value retrieved by the JCcorr+ coefficient enables decisions on the equality of two taxonomy types. If the value is close to 1, it is likely that the type $T_{sj}$ is equal to $T_{tk}$; if the value is 0, the two taxonomy types seem to be unequal. However, the similarity value does not provide an insight into the relatedness of the two types, when the value is neither close to 1 nor 0. Let us consider the type Company and the type AerospaceCompany. The extended corrected Jaccard value would be very small—only those company instances of the Company type that are aerospace companies might be in the intersection, whereas the union set is mainly determined by the instance size of the type Company. In order to detect subtype and associative relations, we introduce two more measures $JCcorr_{T_{sj}}^+$ and $JCcor_{T_{tk}}^+$ rating the intersection size per type:

$$JCcorr_{T_{sj}}^+(T_{sj}, T_{tk}) = \frac{\sqrt{|I(T_{sj}) \cap I(T_{tk})| \times (|I(T_{sj}) \cap I(T_{tk})| - c)}}{|I(T_{sj})| - w|I_d(T_{sj})|} \quad (3)$$

$$JCcorr_{T_{tk}}^+(T_{sj}, T_{tk}) = \frac{\sqrt{|I(T_{sj}) \cap I(T_{tk})| \times (|I(T_{sj}) \cap I(T_{tk})| - c)}}{|I(T_{tk})| - w|I_d(T_{tk})|} \quad (4)$$

These coefficients are the ratio of the intersection size of the instance sets of the two elements $T_{sj}$ and $T_{tk}$ and the size of one of the instance sets (the instance set $I(T_{sj})$ and $I(T_{tk})$ respectively). In words, the three coefficients (JCcorr+, $JCcorr_{T_{sj}}^+$, $JCcorr_{T_{tk}}^+$) may be described in words as follows. The first coefficient JCcorr+, Equation (2), corresponds to a Jaccard factor having a numerator and a denominator, wherein the Jaccard factor is corrected in the numerator with a correction factor and weakened in the denominator with a weakening factor. The second coefficient $JCcorr_{T_{sj}}^+$, Equation (3), corresponds to a ratio between a corrected intersection size and a corrected instance set size, where the corrected intersection size is the size of the intersection of the first set of instances and the second set of instances corrected with a correction factor, and where the corrected instance set size is the size of the first set of instances deducted by the number of instances only found by the first text processing service multiplied with a weakening factor. The third coefficient $JCcorr_{T_{tk}}^+$ Equation (4), corresponds to a ratio between a corrected intersection size and a corrected instance set size, where the corrected intersection size is the size of the intersection of the first set of instances and the second set of instances corrected with a correction factor, and where the corrected instance set size is the size of the second set of instances deducted by the number of instances only found by the second text processing service multiplied with a weakening factor.

All three intersection values together (JCcorr+, $JCcorr_{T_{sj}}^+$, $JCcorr_{T_{tk}}^+$) form the intersection ratio triple (IRT). We can monitor the following states for the values of the IRT metric (noting that these coefficients range between 0 and 1):

If all three values are very high, it is very likely that the elements for which the measures were calculated are equal, i.e., the mapping ($T_{sj}$, $T_{tk}$, ≡) can be derived. In this context, "very high" means greater than 0.8, or as determined according to a transformation operation Trans performed on the three coefficients, as discussed below with reference to FIG. 5.

If $JCcorr_{T_{sj}}^+$ is high and the difference $diff_{T_{tk}}$ of JCcorr+ and $JCcorr_{T_{tk}}^+$ is close to zero, it is an indication that the element $T_{sj}$ is a subtype of $T_{tk}$, i.e., the mapping ($T_{sj}$, $T_{tk}$, <) can be derived. In this context, "high" means greater than 0.65 and "close to zero" means less than 0.05.

If $JCcorr_{T_{tk}}^+$ is high and the difference $diff_{T_{sj}}$ of JCcorr+ and $JCcorr_{T_{sj}}^+$ is close to zero, it is an indication that the element $T_{tk}$ is a subtype of $T_{sj}$, i.e., the mapping ($T_{sj}$, $T_{tk}$, >) can be derived.

If none of the three states above yields, but at least one of the IRT-values is clearly above zero the elements $T_{sj}$ and $T_{tk}$ are associated, i.e., the mapping ($T_{sj}$, $T_{tk}$, ~) can be derived. In this context, "clearly above zero" means greater than 0.2.

The IRT metric can also be applied for intra-matching processes. However, the weighting factor is set to 0, i.e., the corrected Jaccard coefficient (and the modified corrected Jaccard coefficients for the second and the third value of the IRT) is used in fact. In the following we show how our novel metric is used within our combined matcher.

3.4 The Matching Process

Figure 5:
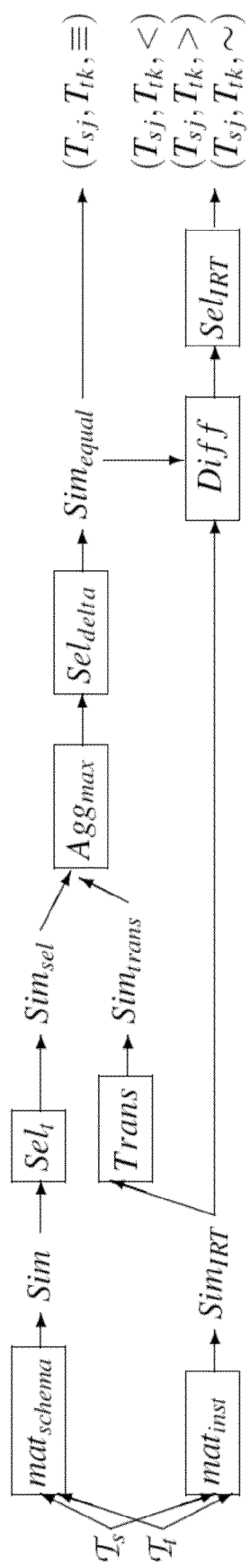
FIG. 5 is a block diagram that illustrates a combination strategy.

As already described, the system uses a complex matching strategy that combines both schema-based and instance-based matcher in a single matching process. FIG. 5 is a block diagram that illustrates this combination strategy. The strategy consists of a number of operators that are commonly used in schema matching such as selection (Sel), aggregation (Agg) and matching (mat). Moreover two additional operators (Trans and Diff) are included that are needed for processing the IRT matcher results. The process starts by executing the schema- and our instance-based matcher (mat$_{schema}$ and mat$_{inst}$). They take as input the two taxonomies $\mathcal{T}_i$ and $\mathcal{T}_j$ and calculate a similarity matrix consisting of $|\mathcal{T}_i| \times |\mathcal{T}_j|$ entries (Sim and Sim$_{IRT}$). Each entry of the Sim-matrix is a value between 0 and 1, with 0 representing low and 1 representing high similarity between two pairs of elements from the input taxonomies. The similarity values of this matrix are calculated by a simple name-matcher. The entries of the Sim$_{IRT}$-matrix are composed of the three values computed by our IRT metric (see an exemplary IRT-matrix in FIG. 2B).

For equal mappings, we trust in the most likely matching candidates identified by the schema-based matcher. As discussed, the naming of taxonomy types is typically clear and precise and therefore name-matchers tend to have a very high precision. With a selection operation Sel, the most probable matching candidates are extracted. This operation sets all matrix entries below a given threshold to 0 and all others to 1. We pick a high selection threshold (0.8) to minimize the chance to select wrong mappings.

To simplify the combination of the Sim$_{IRT}$ matrix and the Sim$_{sel}$ matrix, the Sim$_{IRT}$ matrix is transformed by a transformation operation Trans. It maps the three IRT values to one value that expresses the probability that the two taxonomy elements are equal. Different transformation operations are possible. A trivial transformation operation $trans_{triv}$ just takes the first IRT value (the extended corrected Jaccard coefficient JCcorr+) or the average of all three values. However, such a trivial transformation may lead to false positive equal mappings since some identified candidates may rather be subtype mappings. As already mentioned in Section 3.3, a very low difference value $\text{diff}_{T_{sj}}$ and $\text{diff}_{T_{tk}}$ respectively, may indicate a hierarchical relation. We therefore propose a transformation that lowers the similarity values for such cases:

$$trans = trans_{triv} - corr_{sub}$$

$$corr_{sub} = \begin{cases} 0 & \text{max diff of } IRT \text{ values} < 0.2 \\ z \cdot e^{-\lambda \text{diff}_{T_{sj}}} & JCcorr^+_{T_{sj}} < JCcorr^+_{T_{tk}} \\ z \cdot e^{-\lambda \text{diff}_{T_{tk}}} & JCcorr^+_{T_{sj}} > JCcorr^+_{T_{tk}} \end{cases}$$

with $\lambda > 0$ and $0 \leq z \leq 1$

The transformation relies on an exponential function to weight the influence of the difference values ($\text{diff}_{T_{sj}}$ or $\text{diff}_{T_{tk}}$) on the transformation result. In particular, when the three IRT values are not very close to each other (i.e., having a maximal difference greater than 0.2), the exponential function is applied. The subtype correction $corr_{sub}$ has the biggest value if the difference is zero and then exponentially decreases to zero. The $\lambda$ value defines how strong the value decreases. Example: With $\lambda=20$ and a difference value of 0.05, the value $trans_{triv}$ is decreased by 0.368. For $\lambda=100$ the decrease is only 0.007. The correction value can be further adapted by a weight z that can be based on the value of $JCcorr_{T_{sj}}^+$ and $JCcorr_{T_{tk}}^+$ respectively.

The selected similarity matrix $Sim_{sel}$ is combined with the transformed similarity matrix $Sim_{trans}$ of the instance-based matcher with a MAX-Aggregation operation $Agg_{max}$. For each pair of entity pairs the maximum of the two matrix entries (one entry from the $Sim_{sel}$ and one from $Sim_{trans}$ matrix) is taken. The result of the mapping aggregation still contains up to $|\mathcal{T}_i| \times |\mathcal{T}_j|$ correspondences. From these correspondences the most probable ones need to be selected. A number of selection techniques have been proposed in literature. The system applies the MaxDelta selection from Do and Rahm (2002) in $Sel_{delta}$ since it has shown to be an effective selection strategy. MaxDelta takes the maximal correspondence within a row (or column) of a similarity matrix. Additionally, it includes correspondences from the row (or column) that are within a delta-environment of the maximal correspondence. The size of the delta environment depends on the value of the maximal element for each row (or column). Both sets of maximal correspondences for each row and correspondences for each column are intersected to get the final selection result $Sim_{equal}$. Finally, equality mappings are created from the selected matrix $Sim_{equal}$ for each matrix entry above a given threshold.

Subtype and associative mappings are directly derived from the $Sim_{IRT}$ matrix. However, all equality mapping candidates are eliminated from the matrix (Diff) before a fine granular selection operation $Sel_{IRT}$ is applied. $Sel_{IRT}$ derives subtype mappings if $JCcorr_{T_{sj}}^+$ or $JCcorr_{T_{tk}}^+$) is above a given threshold and if $\text{diff}_{T_{tk}}$ (or $\text{diff}_{T_{sj}}$) is smaller than a distance threshold. All remaining matrix entries that are not selected as subtype mappings but indicate a certain overlap of the instances are categorized as associative mappings if one of the three IRT values is significantly above zero.

The presented strategy can be adaptively fine-tuned by analyzing the results of the schema-based matcher. Differing strength and performance of the extraction services for which taxonomies are matched can be identified. For instance, if the text mining service $S_s$ is consistently stronger than the service $S_t$, we can observe the following: The instance set $I(T_{tk})$ is included in the instance set $I(T_{sj})$ even if the two taxonomy types $T_{sj}$ and $T_{tk}$ are identical (i.e., the schema-based matcher indicates an equivalence relation). For those cases a transformation which corrects subtypes is not recommended. Additionally the selection thresholds can be adapted by observing the instance-matching values for which equivalence relations hold.

4 EXPERIMENTAL SETUP

Before we present the results of our experiments in matching entity taxonomies of text mining services in Section 5, we give an overview of the experimental setup. The goal of the experiments was to evaluate if our automatic matching approach is applicable for matching taxonomies of text mining services and if our novel metric performs better than traditional approaches. All datasets and manually created gold standards are available upon request from the inventors.

4.1 Dataset

We evaluated our approach on three entity taxonomies of public and well known text mining services: OpenCalais (2013), AlchemyAPI (2013) and Evri (2012). We only considered the taxonomies that are provided for English text documents. The entity taxonomy of OpenCalais is documented on the service website, as well as in an OWL ontology. It consists of 39 main entity types. Some of these entity types are further specified with predefined attributes (e.g., the entity Person has the attributes PersonType, CommonName, Nationality). The Type-attributes allow to derive entity subtypes (e.g., Person_Sports, Person_Entertainment). All in all the OpenCalais taxonomy consist of 58 entity types. AlchemyAPI documented its entity types classified in a two-level hierarchy on the service website. We observed that not all types AlchemyAPI extracts are listed on the service website. That is why we extended the taxonomy with types having been extracted during the instance enrichment process. All together the taxonomy then consists of 436 entity types. Evri does not provide an overview of the entity types the service can extract. However, it was possible to extract information via some service calls (by first retrieving facets and then requesting the entities and subentities for these facets). The Evri taxonomy constructed from the service calls is made up of 583 entity types.

4.2 Gold Standard

So far no mappings between the taxonomies of text mining services exist. In order to evaluate the quality of the mappings retrieved with our approach, we manually produced a gold standard. To minimize the matching problem we sampled the more than 180,000 entity type pairs by selecting only those entity pairs, for which the generated instances overlapped (i.e., both entity types had at least one instance in common). The remaining roughly 4,500 entity type pairs were used for human evaluation. We assume that the influence of sampling the entity type pairs is marginal—if there was no overlap of the instance sets retrieved by our instance enrichment algorithm it is unlikely that there will be any overlap of the instances and a potential relation between the taxonomy types when using the services on arbitrary text documents.

In an online evaluation, the entity type pairs plus some sample instances and links to the taxonomies were presented to approximately 40 people. They had to assign the relations "equivalent to", "broader than", "narrower than", "related to" and "no link" to each of the pairs (if unsure they were able to skip the decision) as long as they liked to go on. The online evaluation was run as long as a minimum of two ratings per entity type pair were retrieved. All entity pairs with different ratings were manually checked and a decision for the best rating in consideration of the two entity types was taken (that had been the case for around 1000 entity pairs). The gold standard was further refined when wrong/missing gold standard mappings were identified during the evaluation phase. Overall the imprecision of the information retrieved by the online evaluation was surprisingly high and again indicated that a manual matching and integration of the text mining taxonomies is not feasible.

We use three values to rate the quality of the retrieved mappings compared to the gold standard: precision, recall and F-measure. Precision is the ratio of accurately identified mappings (i.e., the ratio of the retrieved mappings being in the gold standard and the retrieved mappings). Recall marks the ratio of mappings within the gold standard that were identified by the matcher. The F-measure is the harmonic mean of precision and recall and is a common metric to rate the performance of matching techniques. We consider a matcher to be as good as the F-measure is.

4.3 Matcher Configurations

We experimented with different configurations of our instance-based matcher and determined the best setting—a Jaccard correction factor $c=0.6$ and a weight w to 0.95 (i.e., integrated the instances only retrieved by one of the services to five percent into the calculations). (More generally, the weakening factor w may range between 0.90 and 0.97 to achieve suitable results; increasing w above 0.99 has a negative influence, and too small w tends to decrease recall.) We achieved good results with a transformation operation using the average of the three IRT values slightly corrected by the exponential function as given in Section 3.4. We scaled this correction down or rather ignored it, when observing strongly differing service strength (that was the case, when matching the taxonomy of the OpenCalais service with the taxonomies of the weaker services AlchemyAPI and Evri). The selection threshold for retrieving equality mappings was set to 0.2 when used stand alone and to 0.5 when used in the combined matcher. For the subtype selection operation we used a threshold of 0.65 and a distance threshold of 0.05 within inter-matching processes and a threshold of 0.9 and 0.001 within intra-matching processes.

We compared our instance-based matching approach and the IRT metric to common metrics of instance-based matching systems: for equality mappings we compared against the Dice and the corrected Jaccard metric, for hierarchical mappings against the SURD metric. The selection thresholds of Dice and corrected Jaccard were set to those values for which the highest average F-measure could be retrieved (Dice: 0.1, corrected Jaccard with correction factor 0.8:0.05). For SURD we used the threshold proposed in Chua and Kim (2012)—ratios below 0.5 are low values, ratios above 0.5 are high values. Independent from the used metric the instance intersections were determined by comparing the strings of the instances and only accepting exact matches for the intersection. Moreover, the $Sel_{delta}$ selection techniques described in Section 3.4 was applied in all cases.

5 EXPERIMENTAL RESULTS

In the following we present our experimental results proving that our approach is applicable for matching taxonomies of text mining services. We start with the evaluation of the instance enrichment algorithm in Section 5.1 to show that the iterative process can be applied to retrieve a meaningful set of instances. Afterwards we compare the IRT metric to state-of-the-art metrics for instance-based matching in Section 5.2. Finally, we rate the performance of the overall intra- and inter-matching processes in Section 5.3.

5.1 Instance Enrichment

First of all we evaluated our instance enrichment process presented in Section 3.2. We used the English Wikipedia articles as a document base. Furthermore, we set $iter_{max}=f=1$ and slightly adapted the iteration process as follows: (1) The start documents were selected from articles of the Wikipedia category Featured articles. (Featured articles are articles that are considered to be the best in Wikipedia; at the time of our evaluation there had been 3,269 featured articles in the English Wikipedia.) (2) We split step 4 into step 4a doing the search with the extracted token as search string and 4b doing the search among Wikipedia lists. This extension was implemented as it is more likely to find instances for the entity type in a list connected to it (and possibly including an enumeration of instances) than in an article about it.

The gains we made with respect to the coverage rate of the entities when applying the instance enrichment algorithm are as follows. The focused extension of the document set improved the coverage rate significantly. However, we observed that even after this extensive process, a lot of entity types remain with no or few instances. Although it seems to be a trivial process to generate instances for the entity types, it is more complex than expected. Reasons for this are: the partly very complex entity type taxonomies, the occurrence of very specific types in the hierarchies and apparently also the inability of the services to extract all the types of their taxonomy.

5.2 Comparison of Similarity Metrics

We compared the IRT metric to Dice, corrected Jaccard and SURD and analyzed the performance regarding the identification of equal and subtype mappings (see Section 4.3 for the matcher configurations).

Regarding the F-Measure for retrieving equality mappings, the system was able to slightly increase the average F-measure compared to the classical metrics Dice and corrected Jaccard. When individually setting the threshold (e.g., by using the schema-based matcher as indicator), the F-measure as well as precision and recall can be again increased (IRT ideal). Independent from the specific metric used, the performance for the matching process between Evri and AlchemyAPI is worse than the other two matching processes. Reasons for this are on the one hand relatively few instances used for the matching and on the other hand the big performance difference of the two services. We detected that in average equal types only have 30% in common and it is therefore very hard to detect all mappings correctly.

Regarding the results for the identification of subtype mappings, the IRT metric can significantly raise the recall (nearly 30%) by keeping the same good precision like the SURD metric. Thereby the F-measure can be increased by nearly 20% which proves that our IRT metric is suited much better for the matching of text mining taxonomies.

5.3 Overall Matching Process

We applied the instance enrichment algorithm, the IRT metric and the combined matching strategy for the intra- and the inter-matching processes. We compared the mapping results of the intra-matcher to the relations given within the taxonomy structure. Our approach covered exactly the relations given within the OpenCalais taxonomy. On the contrary, the mappings retrieved by our matching approach and the relations of the AlchemyAPI and Evri taxonomy differed. However, this discrepancy is not a result of the inability of our approach, but rather an indication that the taxonomies are not structured accurately. Aircraft-Designer is for example listed as a Person subtype in the taxonomy used by AlchemyAPI. In practice, aircraft designing companies instead of persons are annotated with this type. On the other hand, the flat structure of the taxonomies ignores relations within the subtypes of an entity. USPresident and Politician are both subtypes of Person (which is given in the taxonomy) and the former is in addition a subtype of the latter (this information was retrieved by our approach, but is not represented in the taxonomy). The results show that overreliance on the given taxonomy structures is not reasonable. Instead our approach should be used to validate and correct the taxonomy structure.

The results for the inter-matching processes show that a combination of schema- and instance-based matcher improves quality. The F-measure has been raised by more than 15% compared to the instance-based matcher only approach. An average F-measure of 85% for equal and 77% for subtype shows that an automatic matching of text mining taxonomies is possible. We observed that in average 63% of the wrong subtype mappings and 16% of the missed subtype mappings can be traced back to instance scarcity (i.e., have five or less instances in the intersection). One quarter of the missed equal mappings result from instance scarcity too. By increasing the amount of instances (e.g., by allowing more iterations in the instance enrichment process) and adapting the parameters for each matching process separately (e.g., by using the name-matcher as an indication for the thresholds), quality can be increased.

In summary, the precision achieved by the system is even better as compared to F-measures, and precision is an important factor within combining text mining results accurately.

6 APPLICATION OF TAXONOMY ALIGNMENT

In order to illustrate the value of computing taxonomy alignments between extraction services, we implemented a web news analysis application. We show that the following issues can be solved by combining multiple services and their annotation results: (1) The number of identified entities per category is often very small for a single service. Merging result from multiple services could increase the number of entities per category. (2) By combining taxonomies existing categorizations can be refined. (3) Individual strength of services are combined.

Figure 6:
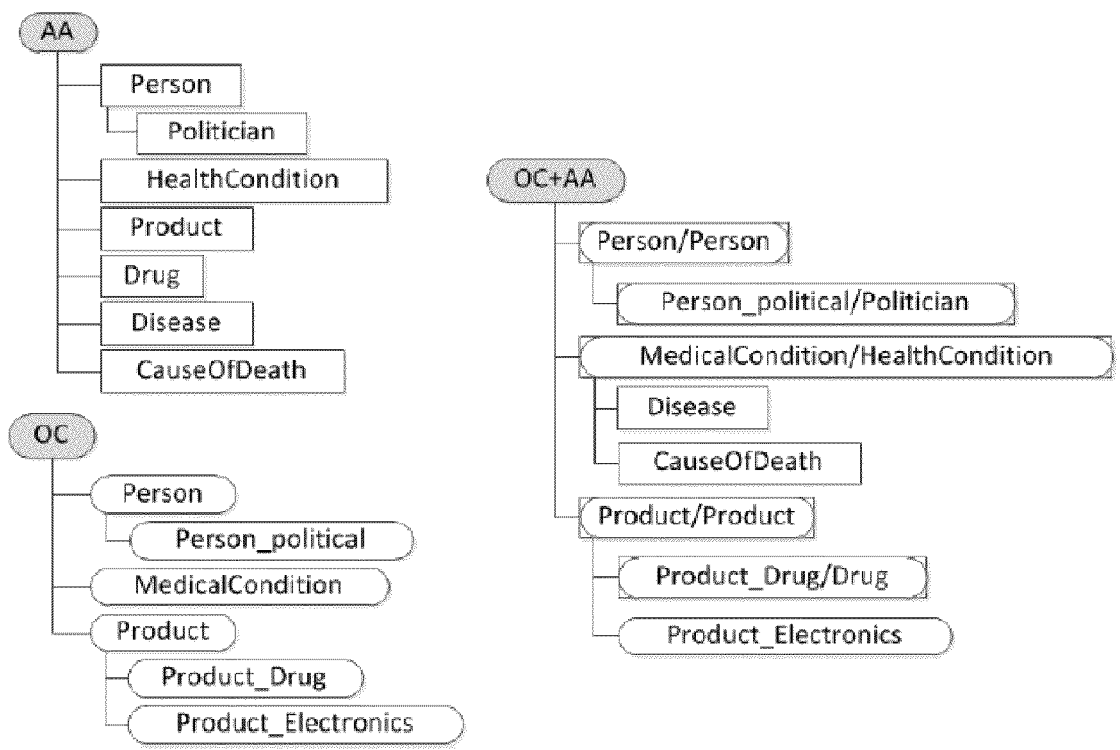
FIG. 6 is a diagram that shows a subset of entity types from two services and the merged taxonomy.

The computed mappings between OpenCalais and AlchemyAPI retrieved within our experimental evaluation (see Section 5.3) are taken and an integrated taxonomy/graph of categories is automatically constructed. A small subset of entity types from both services and the merged taxonomy is shown in FIG. 6. The merged taxonomy consists of categories from AlchemyAPI (AA) and OpenCalais (OC). For equal matches the categories were merged. The merged taxonomy brings structure to flat lists of categories. For instance in AlchemyAPI, Disease, CauseOfDeath, and MedicalCondition were in no special relation. In the merged taxonomy, Disease and CauseOfDeath are now subtypes of MedicalCondition.

By using both services we analyzed web news entries from Reuters Top-News Archives from September and October 2012. All news are annotated and found entities are collected by day. The number of found entities per day can be visualized as sparkline diagrams which help to identify interesting, possible hot topics. Peaks point to days where a specific type of entity was identified particularly often. The automatic taxonomy alignment process identified Person_political (OC) and Polititian (AA) as well as MedicalCondition (OC) and HealthCondition (AA) as equal matches. That these computed mappings are correct can now be verified quite well by the similarity of the generated sparklines of entity frequencies per day.

Some entity types can only found by one of the services like Product_Electronics (OC). A peak on September 21st relates to the iPhone 5™ release whereas a peak on October 24th relates to presentation of Apple's iPad Mini™. Both events could not be observed with AlchemyAPI due to the missing category. Thus the combination of both services is reasonable. For the politicians, both sparklines have similar peaks, one on September 12 and October 12. For instance, on September 12 or shortly before, an attack on the US Embassy in Benghazi (Libya) took place. Many news articles referred to comments that were given by politicians which led to a peak for politicians. Similar peaks can be observed with MedialCondition (OC) and HealthCondition (AA). These peaks can be explained by a severe outbreak of meningitis in the US which caused a number of deaths. The reason for that outbreak was a drug that was used for patients with back pain. This also resulted in a peak for Drugs (AA) accordingly. Still, the number of identified entities for Product_Drug (OC), Drug (AA) are very low. Merging found entities from both services would increase data quality and therefore also other events of smaller scale could possibly automatically be identified.

7 RELATED WORK

A number of matching systems have been developed that are able to semi-automatically match metadata structures like taxonomies, ontologies or XSD schemata (see Shvaiko and Euzenat, 2005; Rahm and Bernstein, 2001). Most of these systems rely on schema-based matching techniques, that consider names, structure or descriptions of elements for matching. For some test-cases they are able to identify equal mappings as we show in our evaluation. However, schema-based techniques are not suited to generate subtype or associative mappings when dealing with flat taxonomies.

A number of existing matching systems like QuickMig (Drumm et al., 2007), COMA++(Do and Rahm, 2002), RiMOM (Li et al., 2009) or Falcon (Hu and Qu, 2008) rely on instance-based matching techniques to find further correspondences when schema-based matchers are not sufficient. Some of them look for equality of single instances (Drumm et al., 2007; Hu and Qu, 2008; Li et al., 2009), others employ metrics that rely on the overlap of instance sets (Do and Rahm, 2002). The latter rely on similarity metrics like Jaccard, corrected Jaccard, Pointwise Mutual Information, Log-Likelihood ratio and Information Gain (see Isaac et al., 2007). Massmann and Rahm (2008) apply the Dice metric to match web directories from Amazon and Ebay. All of these similarity metrics can only be applied to retrieve equal mappings. Moreover, they only perform well when instance sets are quite similar and strongly intersect. They do not consider inaccurate and incomplete instances, like we do with our IRT metric.

The PARIS system (Suchanek et al., 2011) employs a probabilistic approach to find alignments between instances, relations and classes of ontologies. The system is mainly able to identify equivalence relations but the authors also introduce an approach to find subclass relations. However, they neither presented how to apply this approach in order to decide for equivalence or subtype relations of classes nor have they evaluated the identification of subclasses. Chua and Kim (2012) recently proposed a metric of two coefficients to resolve the question how to identify hierarchical relationships between ontologies. This metric is similar to our IRT metric, but does not consider failures within the instances. Moreover, due to relying on only two values and basic heuristics this metric is more inaccurate than the IRT metric presented in this paper. By relying on three coefficients we can further refine relationships and besides identifying equivalence and hierarchical relations also identify associative relations between the types of two taxonomies which cannot be done with metrics proposed so far.

Our instance enrichment approach is noteworthy since it allows us to apply instance-based matching techniques in the first place. Closest to that idea is the QuickMig system (Drumm et al., 2007) where instances have to be provided manually in a questionnaire. None of the existing systems is able to generate instances beforehand to apply instance matching as we do in this paper. Moreover, we are the first to apply ontology matching techniques for matching text mining taxonomies.

8 SUMMARY

In this document we presented a number of contributions that help to automatically match and integrate taxonomies of text mining services and therewith enable the combination of several text mining services. In particular we implemented an instance enrichment algorithm that allows the system to apply instance matching techniques in a complex matching strategy. The system implements a general taxonomy alignment process that applies a new instance-based matcher using a novel metric called IRT. This metric allows the system to derive equality, hierarchical and associative mappings. Our evaluation results are promising, showing that the instance enrichment and matching approach returns good quality mappings and outperforms traditional metrics. Furthermore, the matching process again indicated that the results of different text mining services are very different, i.e., the instances of semantically identical taxonomy types are only partly overlapping (partly only 5% of the instances overlap). This emphasizes the results from Seidler and Schill (2011) that the quality and quantity of text mining can be increased through the aggregation of text mining results from different services.

Figure 7:
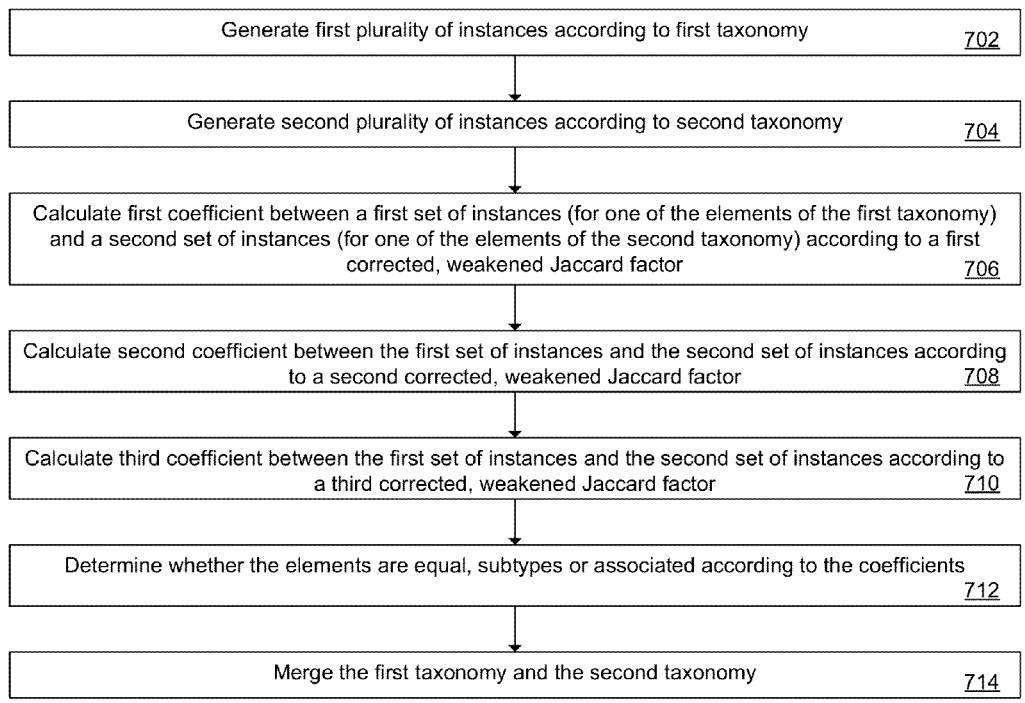
FIG. 7 is a flowchart of a method of merging text analysis results.

FIG. 7 is a flowchart of a method 700 of merging text analysis results. The method generally corresponds to the steps described in the previous sections. The method 700 may be implemented by a computer system (see, e.g., FIG. 2A, FIG. 8), for example as controlled by one or more computer programs.

At 702, the computer system processes a plurality of text information according to a first text processing service to generate a first plurality of instances annotated according to a first taxonomy having a first set of elements. For example, in FIG. 2A the system 100 contacts one of the services 102, and receives the instances for subsequent processing by the execution component 120; in such a case, the processing and generating correspond to contacting (the service on a second computer) and receiving (the results from the second computer).

At 704, the computer system processes the plurality of text information according to a second text processing service to generate a second plurality of instances annotated according to a second taxonomy having a second set of elements. For example, in FIG. 2A the system 100 contacts another of the services 102 and receives another plurality of annotated instances.

At 706, the computer system calculates a first coefficient between a first set of instances and a second set of instances according to a first corrected, weakened Jaccard factor. The first set of instances corresponds to a first element of the first set of elements, and the second set of instances corresponds to a second element of the second set of elements. For example, the auto-mapping component 134 (see FIG. 2A) may calculate the first coefficient. As another example, the first corrected, weakened Jaccard factor corresponds to $JCcorr^+(T_{sj}, T_{tk})$, equation (2) from Section 3.3 above. As another example, the first element may be the Company entity type from OpenCalais (see FIG. 1A) and the second element may be the AerospaceCompany entity type from Evri (see FIG. 1B).

At 708, the computer system calculates a second coefficient between the first set of instances and the second set of instances according to a second corrected, weakened Jaccard factor. For example, the auto-mapping component 134 (see FIG. 2A) may calculate the second coefficient. As another example, the second corrected, weakened Jaccard factor corresponds to $JCcorr_{T_{tk}}^+(T_{sj}, T_{tk})$, equation (3) from Section 3.3 above.

At 710, the computer system calculates a third coefficient between the first set of instances and the second set of instances according to a third corrected, weakened Jaccard factor. For example, the auto-mapping component 134 (see FIG. 2A) may calculate the third coefficient. As another example, the third corrected, weakened Jaccard factor corresponds to $JCcorr_{T_{tk}}^+(T_{sj}, T_{tk})$, equation (4) from Section 3.3 above.

At 712, the computer system determines that the first element is equal to the second element, that the first element is a subtype of the second element, that the second element is a subtype of the first element, or that the first element is associated with the second element, according to the first coefficient, the second coefficient and the third coefficient. As discussed in Section 3.3 above, equality is indicated when all three coefficients are very high; the first element is a subtype of the second when the second coefficient is high and the difference between the first coefficient and the third coefficient is close to zero; the second element is a subtype of the first when the third coefficient is high and the difference between the first coefficient and the second coefficient is close to zero; and the first and second elements are associated when none of the previous cases exist and at least one of the coefficients is clearly above zero. For example, the auto-mapping component 134 (see FIG. 2A) may determine that the elements are subtypes or associated.

At 714, the computer system merges the first taxonomy and the second taxonomy according to the first element and the second element being subtypes, equal, or associated. For example, the auto-mapping component 134 (see FIG. 2A) may merge the taxonomies. As another example, FIG. 6 shows a merged taxonomy OC+AA; the element MedicalCondition from OC is equal to the element HealthCondition from AA; the element Disease is a subtype of the merged element MedicalCondition/HealthCondition; etc.

The general process 700 may then be extended to evaluate the rest of the elements of the taxonomies to complete the merger. This may generally be described as performing the calculating and determining between each of the elements of the first set of elements and each of the elements of the second set of elements, respectively, then performing a merger based on all those results. The process 700 may also be implemented to merge three or more taxonomies. Once the taxonomies have been merged, the entities extracted by the text analysis services become annotated according to the merged taxonomy, and text analysis queries may be performed using the merged taxonomy. This improves efficiency and results as compared to querying the resulting entities separately based on each individual (unmerged) taxonomy.

The following paragraphs provide more details regarding merging taxonomies and results.

Taxonomy Merger

Given a number of taxonomies, $T_{i\,1}, T_{i\,2}, \ldots, T_{i\,n}$, a mapping between each possible pair of input taxonomy needs to be computed. The example of FIG. 8 consists of three simple taxonomies A, B and C that need to be merged and the computed set of mappings. Each mapping entry in the table 802 consists of source, target, relation and confidence. Since the process is automated, the matching process from above is able to assign confidences to each computed mapping.

Due to the automatic instance enrichment and matching not all possible mappings are in fact identified and some might be incorrect or questionable like A.Company>C.Car.

Figure 8:
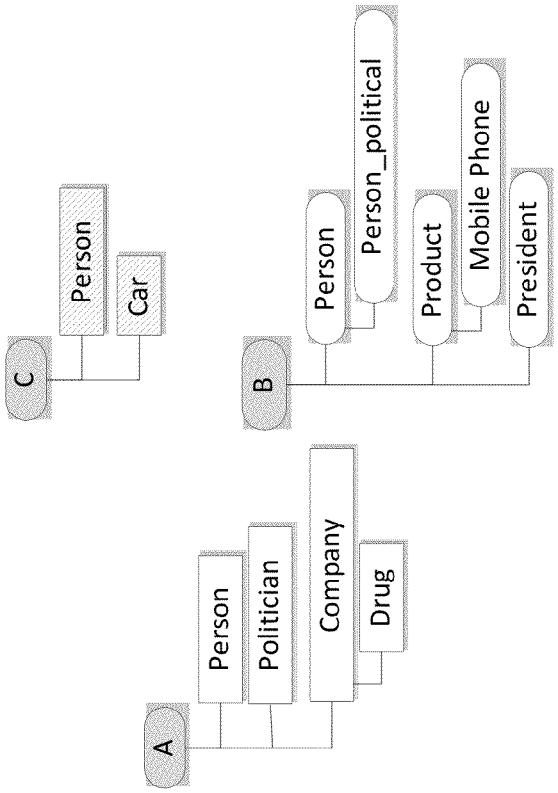
FIG. 8 is a diagram showing three taxonomies to be merged and the computed set of mappings.

In the example of FIG. 8 three equal mappings have been identified, that is between the A.Person category from Taxonomy A and B.Person category from Taxonomy B, between A.Politician and B.Person_Political and between A.Product and B.Product.

Moreover, a number of subtype mappings have been found. In particular with subtype mappings it often happens that a category is a subtype of multiple other categories which is natural. The US-President is both a Person and a Politician. The equal and subtype mappings are complemented by related mappings. Only one related mapping is listed in the example. Finally also intra mappings where computed that later help to structure the final merged taxonomy and correct the given taxonomy structures.

In the following a process is described that builds an integrated global taxonomy that can be exposed for the merged service and that can be used for annotating results.

1. From the found mappings a graph is built. For each type of mapping a different edge is used in the example FIG. 9 (a undirected edge for equal, a directed edge for subtype and a dotted undirected one for associated). Obviously there is still some ambiguity that needs to be resolved and the different categories need to be merged.

2. The system identifies strongly connected components in the graph of equal matches graph by applying graph algorithms. The output are clusters of strongly connected elements (illustrated by the grey ovals in the left side of FIG. 9). These clusters build the new categories. Cluster names are assigned from the category that collected most instances in the instance enrichment example.

3. If a cluster also consists of subtype matches then such matches are changed to equal matches.

4. The edges from categories within a cluster pointing to categories outside of a cluster are now changed to edges between the clusters instead of the individual categories. Multiple similar edges between clusters are replaced by one. However the single edge remembers how many and which representatives formally existed.

5. In the next step, the transitivity relation is exploited to remove unnecessary subtype matches between clusters. That means, if a cluster A is subtype B and B is subtype C then then all subtype edges between A and C can be removed.

6. The remaining edges between the clusters are further cleaned. If there is a subtype and an equal edge between clusters—then the subtype edge is taken and the equal edge is removed. If there are equal edges between clusters the edge is replaced by related edges. If subtype edges point in both directions then the edge with smaller edge count is removed.

There can be further rules to correct the graph such as removing possible cycles of subtype edges.

Figure 9:
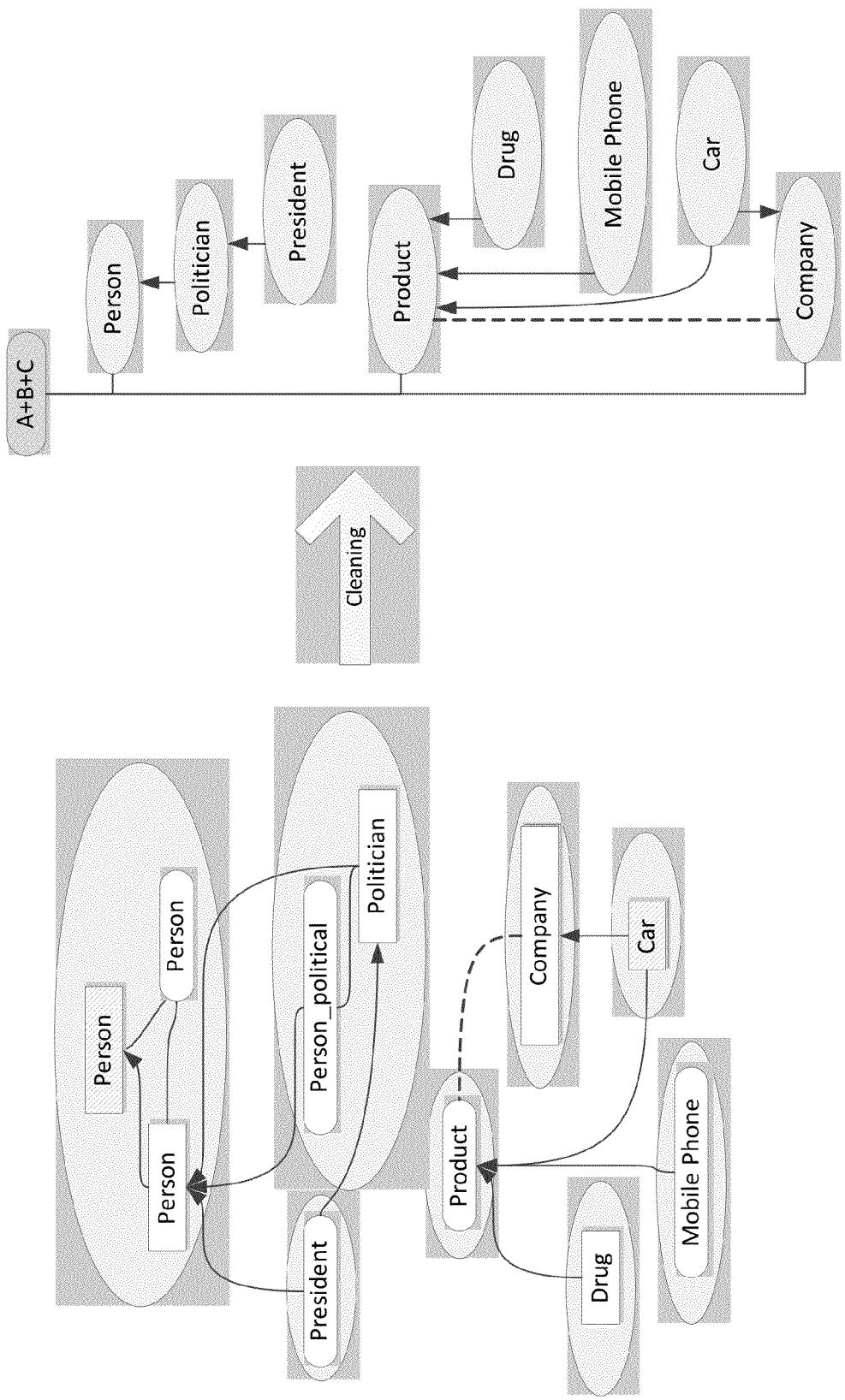
FIG. 9 is a graph of found mappings.

The final merged taxonomy A+B+C is shown in the right side of FIG. 9. Note, that this taxonomy is not a tree, it is rather a graph of categories. The mapping result from above can also be filtered with higher thresholds to remove some mappings with low confidence. The final merged taxonomy structure then has higher credibility. However, the number of categories could increase and the final taxonomy might well be less structured.

For each service that should be merged the merged taxonomy needs to be recomputed. This ensures that the order of addition has no influence on the result.

Note that for each cluster in the taxonomy, the original cluster is retained as a mapping between the individual taxonomies and the global taxonomy.

Result Merger

The results of calling multiple text mining services and references to the services are put into the overall algorithm Merge that performs the enrichment process computes a mapping and the integrated taxonomy if this integrated taxonomy does not already exist for the specific text mining services used.

Finally the results can be merged by using the above taxonomy. The process mergeResult shown in FIG. 10 processes the results of the individual services and aggregates them. For the aggregation of the individual results the global taxonomy is considered to identify the right results and remove erroneous ones and moreover to use one standard taxonomy to categorize the merged results.

Figure 11:
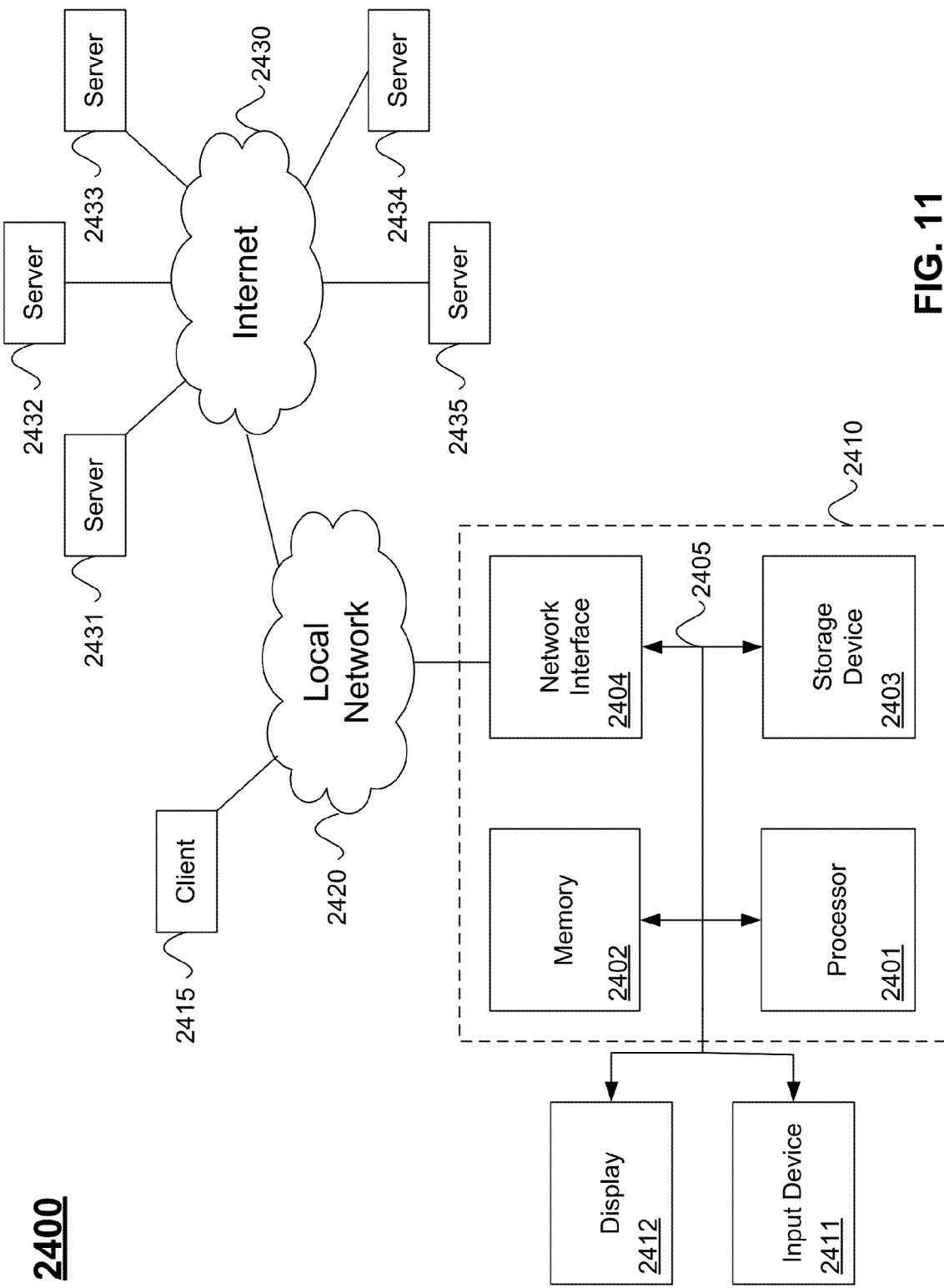
FIG. 11 is a block diagram of an example computer system and network for implementing embodiments of the present disclosure.

FIG. 11 is a block diagram of an example computer system and network 2400 for implementing embodiments of the present disclosure. Computer system 2410 includes a bus 2405 or other communication mechanism for communicating information, and a processor 2401 coupled with bus 2405 for processing information. Computer system 2410 also includes a memory 2402 coupled to bus 2405 for storing information and instructions to be executed by processor 2401, including information and instructions for performing the techniques described above. This memory may also be used for storing temporary variables or other intermediate information during execution of instructions to be executed by processor 2401. Possible implementations of this memory may be, but are not limited to, random access memory (RAM), read only memory (ROM) (when not storing temporary variables or other intermediate information), or both. A storage device 2403 is also provided for storing information and instructions. Common forms of storage devices include, for example, a hard drive, a magnetic disk, an optical disk, a CD-ROM, a DVD, a flash memory, a USB memory card, a solid state drive, or any other medium from which a computer can read. Storage device 2403 may store source code, binary code, or software files for performing the techniques or embodying the constructs above, for example.

Computer system 2410 may be coupled via bus 2405 to a display 2412, such as a cathode ray tube (CRT) or liquid crystal display (LCD), for displaying information to a computer user. An input device 2411 such as a keyboard and/or mouse is coupled to bus 2405 for communicating information and command selections from the user to processor 2401. The combination of these components allows the user to communicate with the system. In some systems, bus 2405 may be divided into multiple specialized buses.

Computer system 2410 also includes a network interface 2404 coupled with bus 2405. Network interface 2404 may provide two-way data communication between computer system 2410 and the local network 2420. The network interface 2404 may be a digital subscriber line (DSL) or a modem to provide data communication connection over a telephone line, for example. Another example of the network interface is a local area network (LAN) card to provide a data communication connection to a compatible LAN. Wireless links is also another example. In any such implementation, network interface 2404 sends and receives electrical, electromagnetic, or optical signals that carry digital data streams representing various types of information.

Computer system 2410 can send and receive information, including messages or other interface actions, through the network interface 2404 to an Intranet or the Internet 2430. In the Internet example, software components or services may reside on multiple different computer systems 2410 or servers 2431, 2432, 2433, 2434 and 2435 across the network. A server 2431 may transmit actions or messages from one component, through Internet 2430, local network 2420, and network interface 2404 to a component on computer system 2410.

The computer system and network 2400 may be configured in a client server manner.

For example, the computer system 2410 may implement a server. The client 2415 may include components similar to those of the computer system 2410.

More specifically, as described above, the server 2431 may implement one of the text mining services 102 (see FIG. 2A) such as OpenCalais. The server 2432 may implement another of the text mining services 102 (e.g., Evri). The server 2410 may implement the system 100 or components thereof, such as the execution component 120 or the auto-mapping component 134. The server 2410 may perform the method 700 (see FIG. 7), for example as controlled by one or more computer programs. The client 2415 may implement a user interface client for a user to interact with the server 2410, for example to implement a user interface for the user 108 (see FIG. 2A). Alternatively the server 2410 may itself implement client functionality such as the user interface.

The above description illustrates various embodiments along with examples of how aspects of the present invention may be implemented. The above examples and embodiments should not be deemed to be the only embodiments, and are presented to illustrate the flexibility and advantages of the present disclosure as defined by the following claims. Based on the above disclosure and the following claims, other arrangements, embodiments, implementations and equivalents will be evident to those skilled in the art and may be employed without departing from the spirit and scope of the disclosure as defined by the claims.

What is claimed is:

1. A computer-implemented method of merging text analysis results, comprising:

processing, by a computer system, a plurality of text information according to a first text processing service to generate a first plurality of instances annotated according to a first taxonomy having a first set of elements;

processing, by the computer system, the plurality of text information according to a second text processing service to generate a second plurality of instances annotated according to a second taxonomy having a second set of elements;

calculating, by the computer system, a first coefficient between a first set of instances and a second set of instances according to a first corrected, weakened Jaccard factor, wherein the first set of instances corresponds to a first element of the first set of elements and wherein the second set of instances corresponds to a second element of the second set of elements;

calculating, by the computer system, a second coefficient between the first set of instances and the second set of instances according to a second corrected, weakened Jaccard factor;

calculating, by the computer system, a third coefficient between the first set of instances and the second set of instances according to a third corrected, weakened Jaccard factor;

determining, by the computer system, that the first element is a subtype of the second element, that the second element is a subtype of the first element, or that the first element is associated with the second element, according to the first coefficient, the second coefficient and the third coefficient; and merging, by the computer system, the first taxonomy and the second taxonomy according to the first element and the second element being associated, the first element being the subtype of the second element, or the second element being the subtype of the first element, wherein the first corrected, weakened Jaccard factor corresponds to a Jaccard factor having a numerator and a denominator, wherein the Jaccard factor is corrected in the numerator with a first correction factor and weakened in the denominator with a first weakening factor, wherein the second corrected, weakened Jaccard factor corresponds to a ratio between a first corrected intersection size and a first corrected instance set size, wherein the first corrected intersection size is a size of an intersection of the first set of instances and the second set of instances corrected with a second correction factor, and wherein the first corrected instance set size is a size of the first set of instances deducted by a number of instances only found by the first text processing service multiplied with a second weakening factor, and wherein the third corrected, weakened Jaccard factor corresponds to a ratio between a second corrected intersection size and a second corrected instance set size, wherein the second corrected intersection size is a size of an intersection of the first set of instances and the second set of instances corrected with a third correction factor, and wherein the second corrected instance set size is a size of the second set of instances deducted by a number of instances only found by the second text processing service multiplied with a third weakening factor.

2. The computer-implemented method of claim 1, further comprising:

determining, by the computer system, that the first element is equal to the second element either when the first coefficient, the second coefficient and the third coefficient are each greater than 0.8 or as determined according to a transformation operation performed on the first coefficient, the second coefficient and the third coefficient, wherein merging the first taxonomy and the second taxonomy comprises merging the first taxonomy and the second taxonomy according to the first element and the second element being equal, associated, the first element being the subtype of the second element, or the second element being the subtype of the first element.

3. The computer-implemented method of claim 1, further comprising:

determining, by the computer system, that the first element is the subtype of the second element when the second coefficient is greater than 0.65 and a difference between the first coefficient and the third coefficient is less than 0.05.

4. The computer-implemented method of claim 1, further comprising:
determining, by the computer system, that the second element is the subtype of the first element when the third coefficient is greater than 0.65 and a difference between the first coefficient and the second coefficient is less than 0.05.

5. The computer-implemented method of claim 1, further comprising:
determining, by the computer system, that the first element is associated with the second element when the first element is not equal to the second element, the first element is not the subtype of the second element, the second element is not the subtype of the first element, and at least one of the first coefficient, the second coefficient and the third coefficient is greater than 0.2.

6. The computer-implemented method of claim 1, wherein the first weakening factor reduces a negative effect resulting from the first plurality of instances being greater than the second plurality of instances or the second plurality of instances being greater than the first plurality of instances.

7. The computer-implemented method of claim 1, wherein the first weakening factor ranges between 0.90 and 0.97.

8. The computer-implemented method of claim 1, wherein the first correction factor ranges between 0.45 and 0.75.

9. The computer-implemented method of claim 1, further comprising:
performing the calculating and determining between each of the elements of the first set of elements and each of the elements of the second set of elements, respectively.

10. The computer-implemented method of claim 1, further comprising:
processing, by the computer system, the plurality of text information according to a third text processing service to generate a third plurality of instances annotated according to a third taxonomy having a third set of elements; and
merging, by the computer system, the first taxonomy, the second taxonomy and the third taxonomy.

11. A system for merging text analysis results, comprising:
a computer including a processor and memory, wherein the computer is configured to process a plurality of text information according to a first text processing service to generate a first plurality of instances annotated according to a first taxonomy having a first set of elements;
wherein the computer is configured to process the plurality of text information according to a second text processing service to generate a second plurality of instances annotated according to a second taxonomy having a second set of elements;
wherein the computer is configured to calculate a first coefficient between a first set of instances and a second set of instances according to a first corrected, weakened Jaccard factor, wherein the first set of instances corresponds to a first element of the first set of elements and wherein the second set of instances corresponds to a second element of the second set of elements;
wherein the computer is configured to calculate a second coefficient between the first set of instances and the second set of instances according to a second corrected, weakened Jaccard factor;
wherein the computer is configured to calculate a third coefficient between the first set of instances and the second set of instances according to a third corrected, weakened Jaccard factor;
wherein the computer is configured to determine that the first element is a subtype of the second element, that the second element is a subtype of the first element, or that the first element is associated with the second element, according to the first coefficient, the second coefficient and the third coefficient;
wherein the computer is configured to merge the first taxonomy and the second taxonomy according to the first element and the second element being associated, the first element being the subtype of the second element, or the second element being the subtype of the first element;
wherein the first corrected, weakened Jaccard factor corresponds to a Jaccard factor having a numerator and a denominator, wherein the Jaccard factor is corrected in the numerator with a first correction factor and weakened in the denominator with a first weakening factor;
wherein the second corrected, weakened Jaccard factor corresponds to a ratio between a first corrected intersection size and a first corrected instance set size, wherein the first corrected intersection size is a size of an intersection of the first set of instances and the second set of instances corrected with a second correction factor, and wherein the first corrected instance set size is a size of the first set of instances deducted by a number of instances only found by the first text processing service multiplied with a second weakening factor; and
wherein the third corrected, weakened Jaccard factor corresponds to a ratio between a second corrected intersection size and a second corrected instance set size, wherein the second corrected intersection size is a size of an intersection of the first set of instances and the second set of instances corrected with a third correction factor, and wherein the second corrected instance set size is a size of the second set of instances deducted by a number of instances only found by the second text processing service multiplied with a third weakening factor.

12. The system of claim 11, wherein the computer is configured to determine that the first element is equal to the second element either when the first coefficient, the second coefficient and the third coefficient are each greater than 0.8 or as determined according to a transformation operation performed on the first coefficient, the second coefficient and the third coefficient, and
wherein merging the first taxonomy and the second taxonomy comprises merging the first taxonomy and the second taxonomy according to the first element and the second element being equal, associated, the first element being the subtype of the second element, or the second element being the subtype of the first element.

13. The system of claim 11, wherein the first weakening factor reduces a negative effect resulting from the first plurality of instances being greater than the second plurality of instances or the second plurality of instances being greater than the first plurality of instances.

14. The system of claim 11, wherein the computer is configured to perform the calculating and determining between each of the elements of the first set of elements and each of the elements of the second set of elements, respectively.

15. The system of claim 11, wherein the computer is configured to process the plurality of text information according to a third text processing service to generate a third plurality of instances annotated according to a third taxonomy having a third set of elements, and
wherein the computer is configured to merge the first taxonomy, the second taxonomy and the third taxonomy.

16. A non-transitory computer readable medium storing instructions to control a computer system for merging text analysis results, comprising:
- a processing component that is configured to control the computer system to process a plurality of text information according to a first text processing service to generate a first plurality of instances annotated according to a first taxonomy having a first set of elements,
  - wherein the processing component is further configured to control the computer system to process the plurality of text information according to a second text processing service to generate a second plurality of instances annotated according to a second taxonomy having a second set of elements;
- a calculating component that is configured to control the computer system to calculate a first coefficient between a first set of instances and a second set of instances according to a first corrected, weakened Jaccard factor, wherein the first set of instances corresponds to a first element of the first set of elements and wherein the second set of instances corresponds to a second element of the second set of elements,
  - wherein the calculating component is further configured to control the computer system to calculate a second coefficient between the first set of instances and the second set of instances according to a second corrected, weakened Jaccard factor, and
  - wherein the calculating component is further configured to control the computer system to calculate a third coefficient between the first set of instances and the second set of instances according to a third corrected, weakened Jaccard factor;
- a determining component that is configured to control the computer system to determine that the first element is a subtype of the second element, that the second element is a subtype of the first element, or that the first element is associated with the second element, according to the first coefficient, the second coefficient and the third coefficient; and
- a merging component that is configured to control the computer system to merge the first taxonomy and the second taxonomy according to the first element and the second element being associated, the first element being the subtype of the second element, or the second element being the subtype of the first element,
- wherein the first corrected, weakened Jaccard factor corresponds to a Jaccard factor having a numerator and a denominator, wherein the Jaccard factor is corrected in the numerator with a first correction factor and weakened in the denominator with a first weakening factor,
- wherein the second corrected, weakened Jaccard factor corresponds to a ratio between a first corrected intersection size and a first corrected instance set size, wherein the first corrected intersection size is a size of an intersection of the first set of instances and the second set of instances corrected with a second correction factor, and wherein the first corrected instance set size is a size of the first set of instances deducted by a number of instances only found by the first text processing service multiplied with a second weakening factor, and
- wherein the third corrected, weakened Jaccard factor corresponds to a ratio between a second corrected intersection size and a second corrected instance set size, wherein the second corrected intersection size is a size of an intersection of the first set of instances and the second set of instances corrected with a third correction factor, and wherein the second corrected instance set size is a size of the second set of instances deducted by a number of instances only found by the second text processing service multiplied with a third weakening factor.

17. The non-transitory computer readable medium of claim 16, wherein the determining component is configured to control the computer system to determine that the first element is equal to the second element either when the first coefficient, the second coefficient and the third coefficient are each greater than 0.8 or as determined according to a transformation operation performed on the first coefficient, the second coefficient and the third coefficient, and
- wherein the merging component is configured to control the computer system to merge the first taxonomy and the second taxonomy according to the first element and the second element being equal, associated, the first element being the subtype of the second element, or the second element being the subtype of the first element.

18. The non-transitory computer readable medium of claim 16, wherein the first weakening factor reduces a negative effect resulting from the first plurality of instances being greater than the second plurality of instances or the second plurality of instances being greater than the first plurality of instances.

19. The non-transitory computer readable medium of claim 16, wherein the computer system is configured to perform the calculating and determining between each of the elements of the first set of elements and each of the elements of the second set of elements, respectively.

20. The non-transitory computer readable medium of claim 16, wherein the computer system is configured to process the plurality of text information according to a third text processing service to generate a third plurality of instances annotated according to a third taxonomy having a third set of elements, and
- wherein the computer system is configured to merge the first taxonomy, the second taxonomy and the third taxonomy.

* * * * *